United States Patent
Fujimoto et al.

(10) Patent No.: US 11,554,832 B2
(45) Date of Patent: Jan. 17, 2023

(54) BICYCLE DERAILLEUR AND METHOD OF CONTROLLING BICYCLE DERAILLEUR

(71) Applicant: SHIMANO INC., Sakai (JP)

(72) Inventors: Naoki Fujimoto, Sakai (JP); Katsuhiro Tachibana, Sakai (JP); Yutaro Yamada, Sakai (JP)

(73) Assignee: SHIMANO INC., Sakai (JP)

( * ) Notice: Subject to any disclaimer, the term of this patent is extended or adjusted under 35 U.S.C. 154(b) by 237 days.

(21) Appl. No.: 17/017,695

(22) Filed: Sep. 11, 2020

(65) Prior Publication Data

US 2022/0081066 A1 Mar. 17, 2022

(51) Int. Cl.
*B62M 9/122* (2010.01)
*B62J 43/30* (2020.01)

(52) U.S. Cl.
CPC .............. *B62M 9/122* (2013.01); *B62J 43/30* (2020.02)

(58) Field of Classification Search
CPC ....... B62M 9/122; B62M 9/132; B62M 25/08
USPC ...................................................... 474/78, 80
See application file for complete search history.

(56) References Cited

U.S. PATENT DOCUMENTS

| | | | | |
|---|---|---|---|---|
| 4,946,425 A * | 8/1990 | Buhlmann | ............. | B62M 9/122 280/238 |
| 6,146,297 A * | 11/2000 | Kimura | ................. | B62M 25/08 280/238 |
| 8,874,338 B2 * | 10/2014 | Miglioranza | .......... | B62M 9/122 180/218 |
| 9,278,728 B1 * | 3/2016 | Sato | ....................... | B62M 9/122 |
| 9,682,744 B2 * | 6/2017 | Watarai | .................. | B62M 25/08 |
| 10,640,171 B2 * | 5/2020 | Hamed | ................... | B62M 25/08 |
| 2002/0094906 A1 * | 7/2002 | Jordan | .................. | B62M 25/08 475/254 |
| 2002/0128097 A1 * | 9/2002 | Takebayashi | ............ | B62M 9/10 474/58 |
| 2003/0071436 A1 * | 4/2003 | Fujii | ..................... | B62M 25/08 280/260 |
| 2003/0096674 A1 * | 5/2003 | Uno | ........................ | B62M 25/04 477/115 |
| 2004/0206188 A1 * | 10/2004 | Takamoto | .............. | B62M 25/08 73/781 |
| 2005/0187051 A1 * | 8/2005 | Fujii | .................... | B62M 25/045 474/70 |
| 2008/0312799 A1 * | 12/2008 | Miglioranza | .......... | B62M 25/08 701/66 |
| 2014/0088806 A1 * | 3/2014 | Lee | ......................... | B60L 15/20 701/22 |

(Continued)

FOREIGN PATENT DOCUMENTS

| JP | 3522226 B2 | 9/2002 |
|---|---|---|
| JP | 2005-238873 | 9/2005 |
| JP | 5406469 B2 | 12/2008 |

*Primary Examiner* — Henry Y Liu
(74) *Attorney, Agent, or Firm* — Mori & Ward, LLP

(57) ABSTRACT

A bicycle derailleur comprises a base member, a movable member, a motor unit, and a controller. The controller is configured to control the motor unit to rotate an output shaft of the motor unit at a first maximum voltage during a first shifting operation of the chain in a first shifting direction. The controller is configured to control the motor unit to rotate the output shaft of the motor unit at a second maximum voltage during a second shifting operation of the chain in a second shifting direction. The first maximum voltage is different from the second maximum voltage.

34 Claims, 16 Drawing Sheets

(56) References Cited

U.S. PATENT DOCUMENTS

| | | | |
|---|---|---|---|
| 2014/0358386 A1* | 12/2014 | Cracco | B62M 9/122 |
| | | | 701/51 |
| 2015/0210354 A1* | 7/2015 | Kuroda | B62M 9/12 |
| | | | 474/70 |
| 2017/0106866 A1* | 4/2017 | Schieffelin | B60W 10/11 |
| 2019/0031290 A1* | 1/2019 | Kurokawa | B62M 9/122 |
| 2019/0249769 A1* | 8/2019 | Hamed | F16H 63/42 |
| 2019/0263474 A1* | 8/2019 | Hamed | B62M 9/123 |
| 2019/0351971 A1* | 11/2019 | Dueweling | B62M 9/122 |
| 2020/0216144 A1* | 7/2020 | Hamed | B62K 23/06 |

\* cited by examiner

BICYCLE DERAILLEUR AND METHOD OF CONTROLLING BICYCLE DERAILLEUR

BACKGROUND OF THE INVENTION

Field of the Invention

The present invention relates to a bicycle derailleur and a method of controlling the bicycle derailleur.

Discussion of the Background

A bicycle includes a derailleur configured to move a chain relative to a plurality of sprockets.

SUMMARY OF THE INVENTION

In accordance with a first aspect of the present invention, a bicycle derailleur comprises a base member, a movable member, a motor unit, and a controller. The movable member is configured to be movably coupled to the base member. The movable member is movable relative to the base member from a second gear position to a first gear position to move a chain in a first shifting direction. The movable member is movable relative to the base member from the second gear position to the first gear position to move the chain in a second shifting direction which is an opposite direction of the first shifting direction. The motor unit is configured to move the movable member relative to the base member between the first gear position and the second gear position. The controller is configured to control the motor unit to rotate an output shaft of the motor unit at a first maximum voltage during a first shifting operation of the chain in the first shifting direction. The controller is configured to control the motor unit to rotate the output shaft of the motor unit at a second maximum voltage during a second shifting operation of the chain in the second shifting direction. The first maximum voltage is different from the second maximum voltage.

With the bicycle derailleur according to the first aspect, it is possible to differ the first maximum voltage and the second maximum voltage based on the specification and/or the structure of the bicycle derailleur.

In accordance with a second aspect of the present invention, the bicycle derailleur according to the first aspect is configured so that a gear ratio is defined as a quotient obtained by dividing a total tooth number of a bicycle front sprocket by a total tooth number of a bicycle rear sprocket. The gear ratio includes a first gear ratio and a second gear ratio that is smaller than the first gear ratio. The gear ratio changes from the second gear ratio to the first gear ratio in the first shifting operation. The gear ratio changes from the first gear ratio to the second gear ratio in the second shifting operation. The first maximum voltage is higher than the second maximum voltage.

With the bicycle derailleur according to the second aspect, it is possible to increase or decrease the maximum voltage when the gear ratio increases or decreases in the shifting operation.

In accordance with a third aspect of the present invention, the bicycle derailleur according to the first aspect is configured so that a gear ratio is defined as a quotient obtained by dividing a total tooth number of a bicycle front sprocket by a total tooth number of a bicycle rear sprocket. The gear ratio includes a first gear ratio and a second gear ratio that is smaller than the first gear ratio. The gear ratio changes from the second gear ratio to the first gear ratio in the first shifting operation. The gear ratio changes from the first gear ratio to the second gear ratio in the second shifting operation. The first maximum voltage is lower than the second maximum voltage.

With the bicycle derailleur according to the third aspect, it is possible to decrease the maximum voltage when the gear ratio increases in the shifting operation.

In accordance with a fourth aspect of the present invention, the bicycle derailleur according to any one of the first to third aspects is configured so that the motor unit is configured to move the movable member relative to the base member in the first shifting operation without stopping the movable member. The motor unit is configured to move the movable member relative to the base member in the second shifting operation without stopping the movable member.

With the bicycle derailleur according to the fourth aspect, it is possible to smooth the first shifting operation and the second shifting operation.

In accordance with a fifth aspect of the present invention, the bicycle derailleur according to any one of the first to fourth aspects is configured so that the controller is configured to control electric power supply to the motor unit at a first amount of electric power in a state where the motor unit moves the movable member relative to the base member in the first shifting operation. The controller is configured to control electric power supply to the motor unit at a second amount of electric power in a state where the motor unit moves the movable member relative to the base member in the second shifting operation. The first amount of electric power is different from the second amount of electric power.

With the bicycle derailleur according to the fifth aspect, it is possible to differ the first amount of electric power and the second amount of electric power based on the specification and/or the structure of the bicycle derailleur.

In accordance with a sixth aspect of the present invention, the bicycle derailleur according to the fifth aspect is configured so that the first amount of electric power is larger than the second amount of electric power.

With the bicycle derailleur according to the sixth aspect, it is possible to increase the first amount of electric power in the first shifting operation and/or decrease the second amount of electric power in the second shifting operation.

In accordance with a seventh aspect of the present invention, the bicycle derailleur according to the fifth aspect is configured so that the first amount of electric power is smaller than the second amount of electric power.

With the bicycle derailleur according to the seventh aspect, it is possible to decrease the first amount of electric power in the first shifting operation and/or increase the second amount of electric power in the second shifting operation.

In accordance with an eighth aspect of the present invention, the bicycle derailleur according to any one of the first to seventh aspects is configured so that the controller is configured to control the motor unit to move the movable member relative to the base member based on gear-region information related to a gear corresponding region defined between the first gear position and the second gear position. The controller is configured to control the motor unit to adjust a position of the movable member based on over-stroke information related to an over-stroke region. The over-stroke region includes a region which is at least partly outside the gear corresponding region.

With the bicycle derailleur according to the eighth aspect, it is possible to push the chain against a sprocket using the over-stroke region. Thus, it is possible to facilitate the first shifting operation and/or the second shifting operation.

In accordance with a ninth aspect of the present invention, the bicycle derailleur according to any one of the first to eighth aspects is configured so that the controller is configured to control the motor unit to move the movable member at a third maximum voltage so as to adjust a position of the movable member based on gear-position information of an additional derailleur which is a separate derailleur from the bicycle derailleur. The third maximum voltage is lower than the first maximum voltage.

With the bicycle derailleur according to the ninth aspect, it is possible to adjust the third maximum voltage depending on a moving speed of a chain guide of the additional derailleur.

In accordance with a tenth aspect of the present invention, the bicycle derailleur according to the eighth aspect is configured so that the controller is configured to control the motor unit, if the gear-region information satisfies a first adjustment condition, to move the movable member relative to the base member in the first shifting direction by a first adjustment distance. The controller is configured to control the motor unit to move the movable member relative to the base member in the second shifting direction by a first return distance after moving the movable member in the first shifting direction by the first adjustment distance. The first return distance is based on the over-stroke information.

With the bicycle derailleur according to the tenth aspect, it is possible to reliably facilitate the first shifting operation.

In accordance with an eleventh aspect of the present invention, the bicycle derailleur according to the eighth aspect is configured so that the controller is configured to control the motor unit, if the gear-region information satisfies a second adjustment condition, to move the movable member relative to the base member in the second shifting direction by a second adjustment distance. The controller is configured to control the motor unit to move the movable member relative to the base member in the first shifting direction by a second return distance after moving the movable member in the second shifting direction by the second adjustment distance. The second return distance is based on the over-stroke information.

With the bicycle derailleur according to the eleventh aspect, it is possible to reliably facilitate the second shifting operation.

In accordance with a twelfth aspect of the present invention, the bicycle derailleur according to any one of the first to eleventh aspects is configured so that the controller is configured to change at least one of the first maximum voltage and the second maximum voltage based on power-source information relating to an electric power source configured to supply electric power to the bicycle derailleur.

With the bicycle derailleur according to the twelfth aspect, it is possible to save power consumption of the electric power source depending on the state of the electric power source.

In accordance with a thirteenth aspect of the present invention, the bicycle derailleur according to the twelfth aspect is configured so that the power-source information includes a remaining level of the electric power source. The controller is configured to reduce higher one of the first maximum voltage and the second maximum voltage if the remaining level of the electric power source is lower than a remaining-level threshold.

With the bicycle derailleur according to the thirteenth aspect, it is possible to save power consumption of the electric power source if the remaining level of the electric power source is lower than the remaining-level threshold.

In accordance with a fourteenth aspect of the present invention, the bicycle derailleur according to the twelfth aspect is configured so that the power-source information includes a remaining level of the electric power source. The controller is configured to reduce lower one of the first maximum voltage and the second maximum voltage if the remaining level of the electric power source is lower than the remaining-level threshold.

With the bicycle derailleur according to the fourteenth aspect, it is possible to save power consumption of the electric power source if the remaining level of the electric power source is lower than the remaining-level threshold.

In accordance with a fifteenth aspect of the present invention, the bicycle derailleur according to any one of the twelfth to fourteenth aspects is configured so that the power-source information includes a remaining level of the electric power source. The controller is configured to change at least one of the first maximum voltage and the second maximum voltage to vary a ratio of higher one of the first maximum voltage and the second maximum voltage to lower one of the first maximum voltage and the second maximum voltage depending on the remaining level of the electric power source.

With the bicycle derailleur according to the fifteenth aspect, it is possible to save power consumption of the electric power source if the remaining level of the electric power source is lower than the remaining-level threshold.

In accordance with a sixteenth aspect of the present invention, a method of controlling a bicycle derailleur comprises controlling a motor unit to move a movable member relative to a base member in a first shifting direction at a first maximum voltage, and controlling the motor unit to move the movable member relative to the base member in a second shifting direction at a second maximum voltage different from the first maximum voltage, the second shifting direction being an opposite direction of the first shifting direction.

With the bicycle derailleur according to the sixteenth aspect, it is possible to differ the first maximum voltage and the second maximum voltage based on the specification and/or the structure of the bicycle derailleur.

In accordance with a seventeenth aspect of the present invention, a bicycle derailleur comprises a base member, a movable member, a motor unit, and a controller. The movable member is configured to be movably coupled to the base member. The movable member is movable relative to the base member from a second gear position to a first gear position to move a chain in a first shifting direction. The movable member is movable relative to the base member from the second gear position to the first gear position to move the chain in a second shifting direction which is an opposite direction of the first shifting direction. The motor unit is configured to move the movable member relative to the base member between the first gear position and the second gear position. The controller is configured to control the motor unit to move the movable member relative to the base member in the first shifting direction at a first moving speed. The controller is configured to control the motor unit to move the movable member relative to the base member in the second shifting direction at a second moving speed different from the first moving speed.

With the bicycle derailleur according to the seventeenth aspect, it is possible to differ the first moving speed and the second moving speed based on the specification and/or the structure of the bicycle derailleur.

In accordance with an eighteenth aspect of the present invention, the bicycle derailleur according to the seventeenth aspect is configured so that a gear ratio is defined as a quotient obtained by dividing a total tooth number of a bicycle front sprocket by a total tooth number of a bicycle rear sprocket. The gear ratio includes a first gear ratio and a second gear ratio that is smaller than the first gear ratio. The gear ratio changes from the second gear ratio to the first gear ratio in the first shifting operation. The gear ratio changes from the first gear ratio to the second gear ratio in the second shifting operation. The first moving speed is higher than the second moving speed.

With the bicycle derailleur according to the eighteenth aspect, it is possible to increase or decrease the moving speed when the gear ratio increases or decreases in the shifting operation.

In accordance with a nineteenth aspect of the present invention, the bicycle derailleur according to the seventeenth aspect is configured so that a gear ratio is defined as a quotient obtained by dividing a total tooth number of a bicycle front sprocket by a total tooth number of a bicycle rear sprocket. The gear ratio includes a first gear ratio and a second gear ratio that is smaller than the first gear ratio. The gear ratio changes from the second gear ratio to the first gear ratio in the first shifting operation. The gear ratio changes from the first gear ratio to the second gear ratio in the second shifting operation. The first moving speed is lower than the second moving speed.

With the bicycle derailleur according to the nineteenth aspect, it is possible to increase or decrease the moving speed when the gear ratio increases or decreases in the shifting operation.

In accordance with a twentieth aspect of the present invention, the bicycle derailleur according to any one of the seventeenth to nineteenth aspects is configured so that the first moving speed is a moving speed at which the motor unit moves the movable member relative to the base member in the first shifting direction without stopping the movable member. The second moving speed is a moving speed at which the motor unit moves the movable member relative to the base member in the second shifting direction without stopping the movable member.

With the bicycle derailleur according to the twentieth aspect, it is possible to smooth the first shifting operation and the second shifting operation.

In accordance with a twenty-first aspect of the present invention, the bicycle derailleur according to any one of the seventeenth to twentieth aspects is configured so that the controller is configured to control the motor unit to generate first output power in a state where the motor unit moves the movable member relative to the base member in the first shifting direction at the first moving speed. The controller is configured to control the motor unit to generate second output power in a state where the motor unit moves the movable member relative to the base member in the second shifting direction at the second moving speed. The second output power is different from the first output power.

With the bicycle derailleur according to the twenty-first aspect, it is possible to differ the first output power and the second output power based on the specification and/or the structure of the bicycle derailleur.

In accordance with a twenty-second aspect of the present invention, the bicycle derailleur according to any one of the seventeenth to twenty-first aspects is configured so that the controller is configured to control electric power supply to the motor unit at a first amount of electric power in a state where the motor unit moves the movable member relative to the base member in the first shifting operation. The controller is configured to control electric power supply to the motor unit at a second amount of electric power in a state where the motor unit moves the movable member relative to the base member in the second shifting operation. The first amount of electric power is different from the second amount of electric power.

With the bicycle derailleur according to the twenty-second aspect, it is possible to differ the first amount of electric power and the second amount of electric power based on the specification and/or the structure of the bicycle derailleur.

In accordance with a twenty-third aspect of the present invention, the bicycle derailleur according to the twenty-second aspect is configured so that the first amount of electric power is larger than the second amount of electric power.

With the bicycle derailleur according to the twenty-third aspect, it is possible to increase the first amount of electric power in the first shifting operation and/or decrease the second amount of electric power in the second shifting operation.

In accordance with a twenty-fourth aspect of the present invention, the bicycle derailleur according to the twenty-second aspect is configured so that the first amount of electric power is smaller than the second amount of electric power.

With the bicycle derailleur according to the twenty-fourth aspect, it is possible to decrease the first amount of electric power in the first shifting operation and/or increase the second amount of electric power in the second shifting operation.

In accordance with a twenty-fifth aspect of the present invention, the bicycle derailleur according to any one of the seventeenth to twenty-fourth aspects is configured so that the controller is configured to control the motor unit to move the movable member relative to the base member based on gear-region information related to a gear corresponding region defined between the first gear position and the second gear position. The controller is configured to control the motor unit to adjust a position of the movable member based on over-stroke information related to an over-stroke region. The over-stroke region includes a region which is at least partly outside the gear corresponding region.

With the bicycle derailleur according to the twenty-fifth aspect, it is possible to push the chain against a sprocket using the over-stroke region. Thus, it is possible to facilitate the first shifting operation and/or the second shifting operation.

In accordance with a twenty-sixth aspect of the present invention, the bicycle derailleur according to any one of the seventeenth to twenty-fifth aspects is configured so that the controller is configured to control the motor unit to move the movable member at a third moving speed so as to adjust a position of the movable member based on gear-position information of an additional derailleur which is a separate derailleur from the bicycle derailleur. The third moving speed is lower than the first moving speed.

With the bicycle derailleur according to the twenty-sixth aspect, it is possible to adjust the third moving speed depending on a moving speed of a chain guide of the additional derailleur.

In accordance with a twenty-seventh aspect of the present invention, the bicycle derailleur according to the twenty-fifth aspect is configured so that the controller is configured to control the motor unit, if the gear-region information satisfies a first adjustment condition, to move the movable member relative to the base member at the first moving speed by a first adjustment distance. The controller is configured to control the motor unit to move the movable member relative to the base member at the second moving speed by a first return distance after moving the movable member by the first adjustment distance. The first return distance is based on the over-stroke information.

With the bicycle derailleur according to the twenty-seventh aspect, it is possible to reliably facilitate the first shifting operation.

In accordance with a twenty-eighth aspect of the present invention, the bicycle derailleur according to the twenty-seventh aspect is configured so that the first moving speed is higher than the second moving speed.

With the bicycle derailleur according to the twenty-eighth aspect, it is possible to increase the first moving speed in the first shifting operation and/or decrease the second moving speed in the second shifting operation.

In accordance with a twenty-ninth aspect of the present invention, the bicycle derailleur according to the twenty-seventh aspect is configured so that the first moving speed is lower than the second moving speed.

With the bicycle derailleur according to the twenty-ninth aspect, it is possible to decrease the first moving speed in the first shifting operation and/or increase the second moving speed in the second shifting operation.

In accordance with a thirtieth aspect of the present invention, the bicycle derailleur according to any one of the twenty-fifth to twenty-ninth aspects is configured so that the controller is configured to control the motor unit, if the gear-region information satisfies a second adjustment condition, to move the movable member relative to the base member at the second moving speed by a second adjustment distance. The controller is configured to control the motor unit to move the movable member relative to the base member at the first moving speed by a second return distance after moving the movable member by the second adjustment distance. The second return distance is based on the over-stroke information.

With the bicycle derailleur according to the thirtieth aspect, it is possible to reliably facilitate the second shifting operation.

In accordance with a thirty-first aspect of the present invention, the bicycle derailleur according to the thirtieth aspect is configured so that the first moving speed is higher than the second moving speed.

With the bicycle derailleur according to the thirty-first aspect, it is possible to increase the first moving speed in the first shifting operation and/or decrease the second moving speed in the second shifting operation.

In accordance with a thirty-second aspect of the present invention, the bicycle derailleur according to the thirtieth aspect is configured so that the first moving speed is lower than the second moving speed.

With the bicycle derailleur according to the thirty-second aspect, it is possible to decrease the first moving speed in the first shifting operation and/or increase the second moving speed in the second shifting operation.

In accordance with a thirty-third aspect of the present invention, the bicycle derailleur according to any one of the seventeenth to thirty-second aspects is configured so that a first direction operating time is defined from a timing at which the motor unit starts to move the movable member relative to the base member from the second gear position toward the first gear position in the first shifting direction to a timing at which the motor unit stops moving the movable member at the first gear position. A second direction operating time is defined from a timing at which the motor unit starts to move the movable member relative to the base member from the first gear position toward the second gear position in the second shifting direction to a timing at which the motor unit stops moving the movable member at the second gear position. The first direction operating time is different from the second direction operating time.

With the bicycle derailleur according to the thirty-third aspect, it is possible to differ the first direction operating time and the second direction operating time based on the specification and/or the structure of the bicycle derailleur.

In accordance with a thirty-fourth aspect of the present invention, a method of controlling a bicycle derailleur comprises controlling a motor unit to move a movable member relative to a base member in a first shifting direction at a first moving speed, and controlling the motor unit to move the movable member relative to the base member in a second shifting direction at a second moving speed different from the first moving speed, the second shifting direction being an opposite direction of the first shifting direction.

With the bicycle derailleur according to the thirty-fourth aspect, it is possible to differ the first moving speed and the second moving speed based on the specification and/or the structure of the bicycle derailleur.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
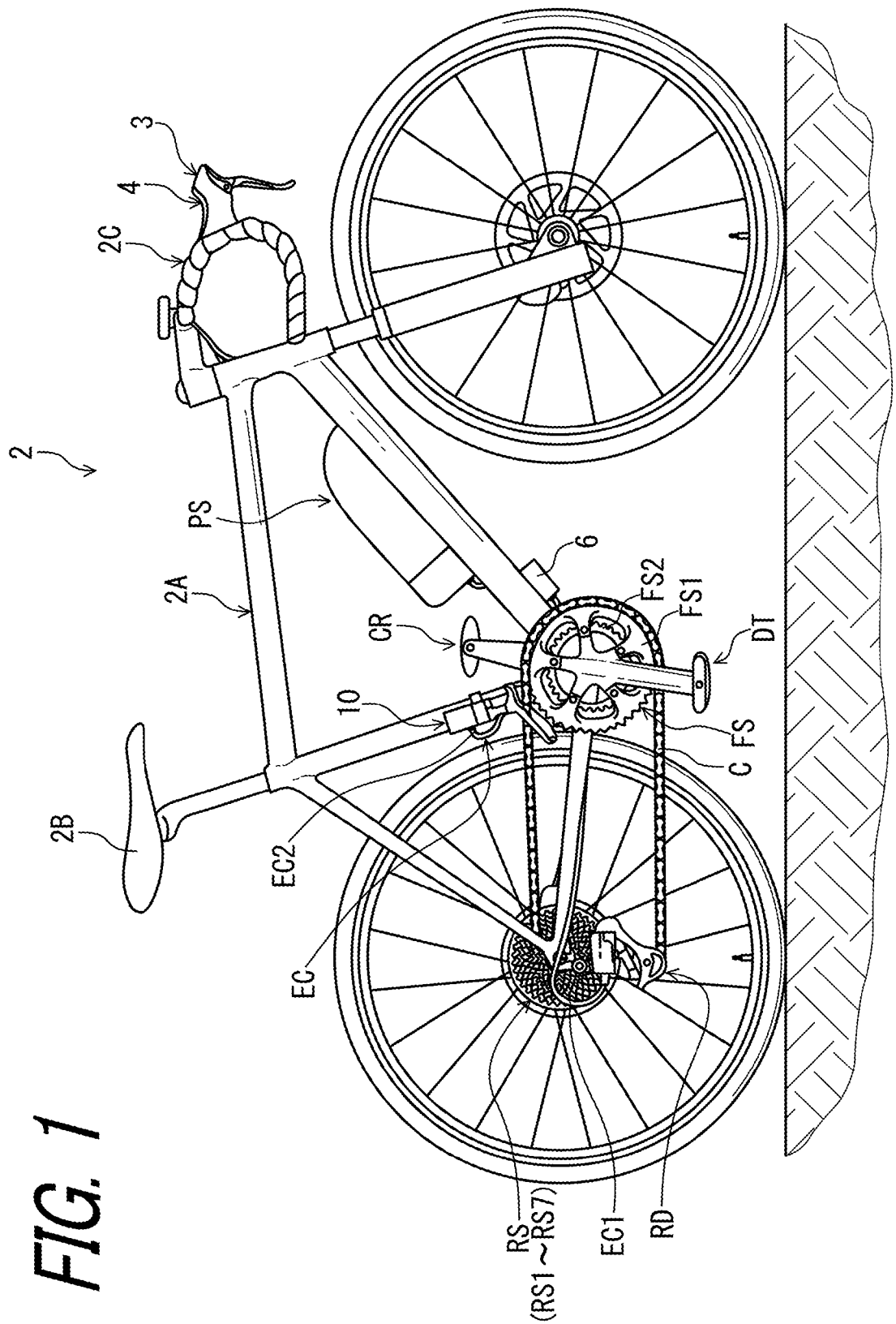
FIG. 1 is a side elevational view of a bicycle including a bicycle derailleur in accordance with an embodiment.

The embodiment(s) will now be described with reference to the accompanying drawings, wherein like reference numerals designate corresponding or identical elements throughout the various drawings.

As seen in FIG. 1, a bicycle 2 includes a bicycle derailleur 10 in accordance with an embodiment. In the present embodiment, the bicycle 2 includes a road bike. However, the bicycle 2 can include a mountain bike, a city bike, a tricycle, a cargo bike, a recumbent bike, or any type of bicycles. In the present embodiment, the bicycle derailleur 10 includes a front derailleur. However, the structure of the bicycle derailleur 10 can apply to other derailleurs such as a rear derailleur.

The bicycle 2 further includes a bicycle frame 2A, a saddle 2B, a handlebar 2C, an operating device 3, an operating device 4, a drive train DT, and an electric power source PS. The operating devices 3 and 4 are configured to be mounted to the handlebar 2C. The drive train DT includes a crank CR, a front sprocket assembly FS, a rear sprocket assembly RS, a chain C, the bicycle derailleur 10, and a bicycle derailleur RD. The bicycle derailleur RD can also be referred to as an additional derailleur RD.

The front sprocket assembly FS is secured to the crank CR and includes a bicycle front sprocket FS1 and a bicycle front sprocket FS2. The bicycle front sprocket FS1 has an outer diameter larger than an outer diameter of the bicycle front sprocket FS2. Thus, the bicycle front sprocket FS1 can also be referred to as a larger sprocket FS1. The bicycle front sprocket FS2 can also be referred to as a smaller sprocket FS2.

The rear sprocket assembly RS is rotatably mounted to the bicycle frame 2A and a plurality of bicycle rear sprockets RS1 to RS7. The chain C is engaged with the front sprocket assembly FS and the rear sprocket assembly RS. The bicycle derailleur RD is mounted to the bicycle frame 2A and is configured to shift the chain C relative to a plurality of sprockets of the rear sprocket assembly RS to change a gear position. The bicycle derailleur 10 is configured to shift the chain C relative to the bicycle front sprockets FS1 and FS2 of the front sprocket assembly FS. The electric power source PS is configured to be mounted to the bicycle frame 2A. In the present embodiment, the electric power source PS is configured to be mounted on a down tube of the bicycle frame 2A. However, the electric power source PS can be configured to be mounted to other parts of the bicycle frame 2A such as a seat tube. The electric power source PS can be configured to be directly mounted to other devices such as the bicycle derailleur 10 or RD.

The bicycle derailleur RD is configured to be operated using the operating device 3. The bicycle derailleur 10 is configured to be operated using the operating device 4. In the present embodiment, the bicycle derailleur RD is configured to be electrically connected to the operating devices 3 and 4 through a wireless communication channel. The bicycle derailleur RD is electrically connected to the electric power source PS through an electric cable EC1 of an electric wiring structure EC. The bicycle derailleur 10 is electrically connected to the electric power source PS through an electric cable EC2 of the electric wiring structure EC. The electric power source PS is configured to supply electric power to the bicycle derailleurs 10 and RD through the electric cables EC1 and EC2. For example, the bicycle derailleurs 10 and RD and the electric power source PS are configured to communicate with each other using a power line communication (PLC). However, the bicycle derailleurs 10 and RD and the electric power source PS can be configured to communicate with each other using other communication method such as a wireless communication. At least one of the operating devices 3 and 4 can be configured to communicate with at least one of the bicycle derailleurs 10 and RD and the electric power source PS through a wired communication channel.

In the present embodiment, the bicycle derailleur RD is configured to wirelessly communicate with the operating devices 3 and 4. The bicycle derailleur RD is configured to receive control signals wirelessly transmitted from each of the operating devices 3 and 4. The bicycle derailleur 10 is configured to communicate with the bicycle derailleur RD through the electric power source PS and the electric wiring structure EC. The bicycle derailleur RD is configured to transmit, through the electric power source PS and the electric wiring structure EC to the bicycle derailleur 10, control signals wirelessly received from the operating device 4 by the bicycle derailleur RD.

However, the configuration of the bicycle 2 is not limited to the above configuration. For example, each of the bicycle derailleurs 10 and RD can be configured to be electrically connected to the electric power source PS through the electric wiring structure EC and an additional device such as a junction box 6. Each of the bicycle derailleur RD and the electric power source PS can be configured to be electrically connected to the bicycle derailleur 10 through the electric cables EC1 and EC2 if the bicycle derailleur 10 includes a plurality of connection ports. Each of the bicycle derailleur 10 and the electric power source PS can be configured to be electrically connected to the bicycle derailleur RD through the electric cables EC1 and EC2 if the bicycle derailleur RD includes a plurality of connection ports. The bicycle derailleur 10 can be configured to be electrically connected to the bicycle derailleur RD through the electric cable EC1 or EC2 if the electric power source PS is directly mounted to one of the bicycle derailleurs 10 and RD. Furthermore, the bicycle derailleur RD can be connected to at least one of the operating devices 3 and 4 through an electric cable without wireless communication. In addition, the bicycle derailleur 10 can be configured to be electrically connected to at least one of the operating devices 3 and 4 through a wireless communication channel.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle 2B or a seat) in the bicycle 2 with facing the handlebar 2C. Accordingly, these terms, as utilized to describe the bicycle derailleur 10 or other components, should be interpreted relative to the bicycle 2 equipped with the bicycle derailleur 10 as used in an upright riding position on a horizontal surface.

Figure 2:
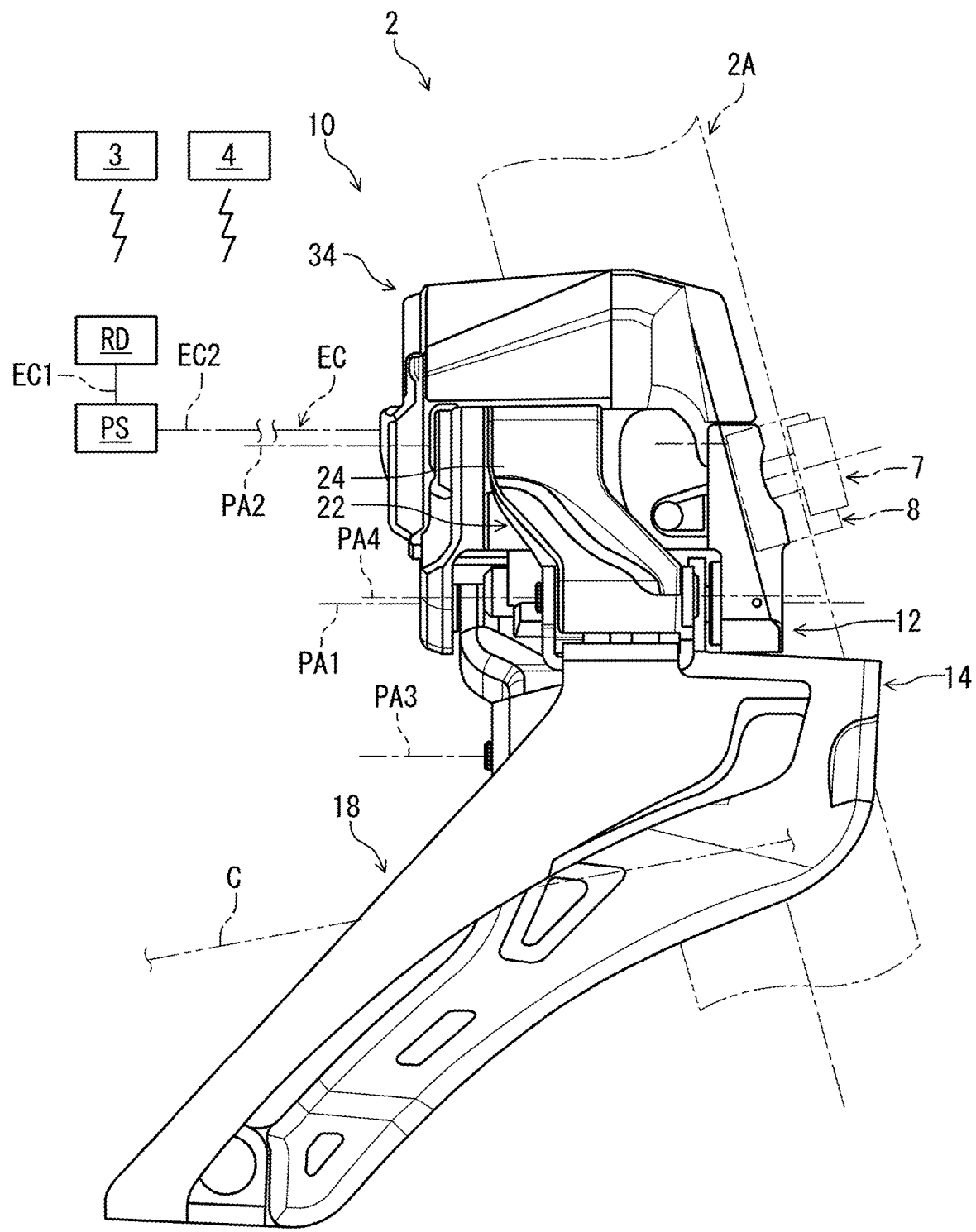
FIG. 2 is a side elevational view of the bicycle derailleur of the bicycle illustrated in FIG. 1.

As seen in FIG. 2, the bicycle derailleur 10 comprises a base member 12. The base member 12 is configured to be mounted to the bicycle frame 2A. The bicycle derailleur 10 is configured to be coupled to the bicycle frame 2A with at least one of a mounting fastener 7 and a clamp 8. The bicycle derailleur 10 is coupled to the clamp 8 with the mounting fastener 7. However, another mounting structure can apply to the bicycle derailleur 10 if needed and/or desired.

The bicycle derailleur comprises a movable member 14. The movable member 14 is configured to be movably coupled to the base member 12. The movable member 14 includes a chain guide 18. In a case where the bicycle derailleur is a rear derailleur, the movable member 14 includes a movable body and a chain guide pivotally coupled to the movable body.

Figure 3:
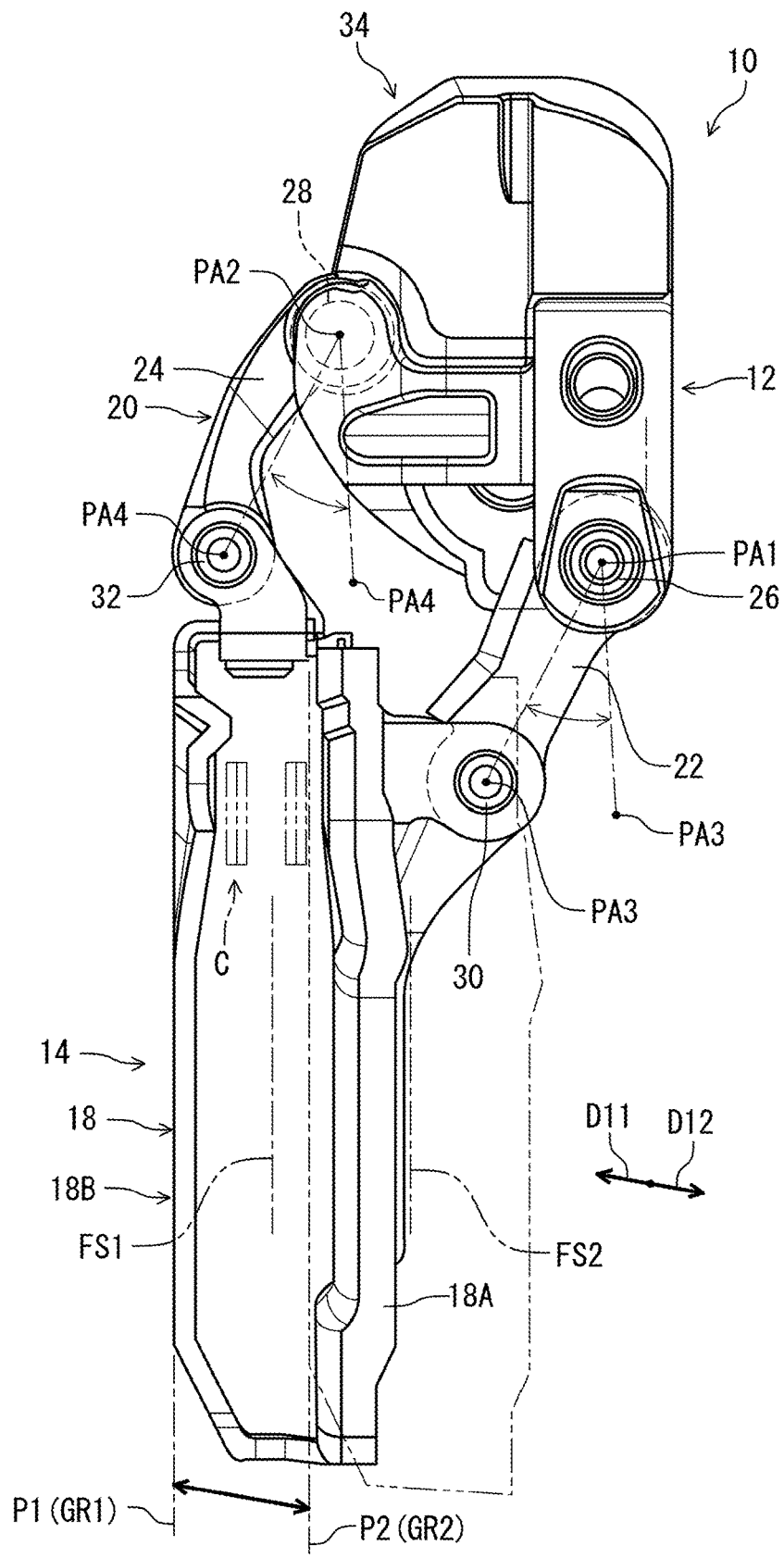
FIG. 3 is a front view of the bicycle derailleur illustrated in FIG. 2.

As seen in FIG. 3, the chain guide 18 comprises a first guide member 18A and a second guide member 18B. The first guide member 18A is configured to guide the chain C in the first shifting direction D11. The second guide member 18B is configured to guide the chain C in the second shifting direction D12. The second guide member 18B is spaced apart from the first guide member 18A in the first shifting direction D11. The second guide member 18B is coupled to the first guide member 18A.

The bicycle derailleur 10 comprises a linkage structure 20. The linkage structure 20 is configured to movably couple the chain guide 18 to the base member 12. The linkage structure 20 includes a first link member 22 and a second link member 24. The first link member 22 is pivotally coupled to the base member 12 about a first pivot axis PAL. The second link member 24 is pivotally coupled to the base member 12 about a second pivot axis PA2. The first link member 22 is pivotally coupled to the chain guide 18 about a third pivot axis PA3. The second link member 24 is pivotally coupled to the chain guide 18 about a fourth pivot axis PA4.

The linkage structure 20 includes a first link pin 26, a second link pin 28, a third link pin 30, and a fourth link pin 32. The first link pin 26 is configured to pivotally couple the first link member 22 to the base member 12 about the first pivot axis PAL. The second link pin 28 is configured to pivotally couple the second link member 24 to the base member 12 about the second pivot axis PA2. The third link pin 30 is configured to pivotally couple the first link member 22 to the chain guide 18 about the third pivot axis PA3. The fourth link pin 32 is configured to pivotally couple the second link member 24 to the chain guide 18 about the fourth pivot axis PA4.

The movable member 14 is movable relative to the base member 12 from a second gear position P2 to a first gear position P1 to move the chain C in a first shifting direction D11. The movable member 14 is movable relative to the base member 12 from the second gear position P2 to the first gear position P1 to move the chain C in a second shifting direction D12. The second shifting direction D12 is an opposite direction of the first shifting direction D11. The first gear position P1 is a position corresponding to the larger sprocket FS1 (see, e.g., FIG. 1) of the front sprocket assembly FS. The second gear position P2 is a position corresponding to the smaller sprocket FS2 (see, e.g., FIG. 1) of the front sprocket assembly FS. The chain guide 18 is configured to guide the chain C from the smaller sprocket FS2 to the larger sprocket FS1 in the first shifting direction D11. The chain guide 18 is configured to guide the chain C from the larger sprocket FS1 to the smaller sprocket FS2 in the second shifting direction D12.

As seen in FIG. 1, a gear ratio is defined as a quotient obtained by dividing a total tooth number of the bicycle front sprocket FS1 or FS2 by a total tooth number of the bicycle rear sprocket RS1, RS2, RS3, RS4, RS5, RS6, RS7, RS8, or RS7. The gear ratio includes a first gear ratio GR1 and a second gear ratio GR2 that is smaller than the first gear ratio GR1. As seen in FIG. 3, the first gear position P1 of the movable member 14 corresponds to the first gear ratio GR1. The second gear position P2 of the movable member 14 corresponds to the second gear ratio GR2. The gear ratio changes from the second gear ratio GR2 to the first gear ratio GR1 in the first shifting operation. The gear ratio changes from the first gear ratio GR1 to the second gear ratio GR2 in the second shifting operation.

Figure 4:
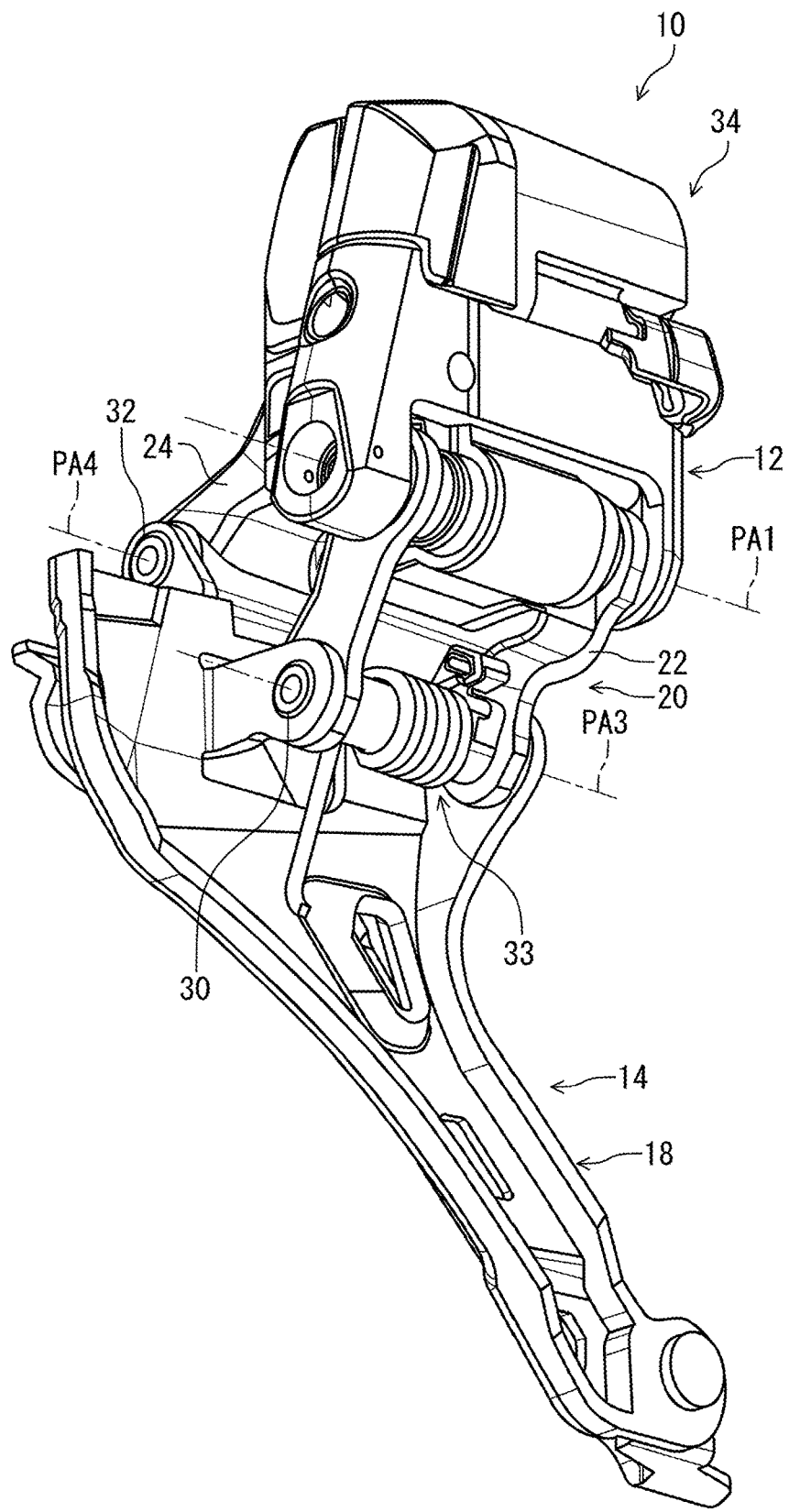
FIG. 4 is a perspective view of the bicycle derailleur illustrated in FIG. 2.

As seen in FIG. 4, the bicycle derailleur 10 comprises a biasing member 33. The biasing member 33 is configured to bias the chain guide 18 from one of the second gear position P2 (see, e.g., FIG. 3) and the first gear position P1 (see, e.g., FIG. 5) toward the other of the second gear position P2 and the first gear position P1. In the present embodiment, the biasing member 33 is configured to bias the chain guide 18 from the second gear position P2 (see, e.g., FIG. 3) toward the first gear position P1 (see, e.g., FIG. 3). However, the biasing member 33 can be configured to bias the chain guide 18 from the first gear position P1 (see, e.g., FIG. 3) toward the second gear position P2 (see, e.g., FIG. 3) if needed and/or desired.

As seen in FIG. 3, the bicycle derailleur 10 comprises a motor unit 34. The motor unit 34 is configured to move the movable member 14 relative to the base member 12 between the first gear position P1 and the second gear position P2. The motor unit 34 is configured to move the chain guide 18 relative to the base member 12 from the second gear position P2 to the first gear position P1 in the first shifting direction D11. The motor unit 34 is configured to move the chain guide 18 relative to the base member 12 from the first gear position P1 to the second gear position P2 in the second shifting direction D12.

The motor unit 34 is configured to apply rotational force to at least one of the chain guide 18 and the linkage structure 20 to move the chain guide 18 relative to the base member 12. In the present embodiment, the motor unit 34 is configured to apply the rotational force to the linkage structure 20 through the first link pin 26 to move the chain guide 18 relative to the base member 12. The motor unit 34 is configured to apply the rotational force to the chain guide 18 through the first link pin 26 and the linkage structure 20 to move the chain guide 18 relative to the base member 12. However, the motor unit 34 can be configured to apply the rotational force to the chain guide 18 or both the chain guide 18 and the linkage structure 20 if needed and/or desired.

Figure 5:
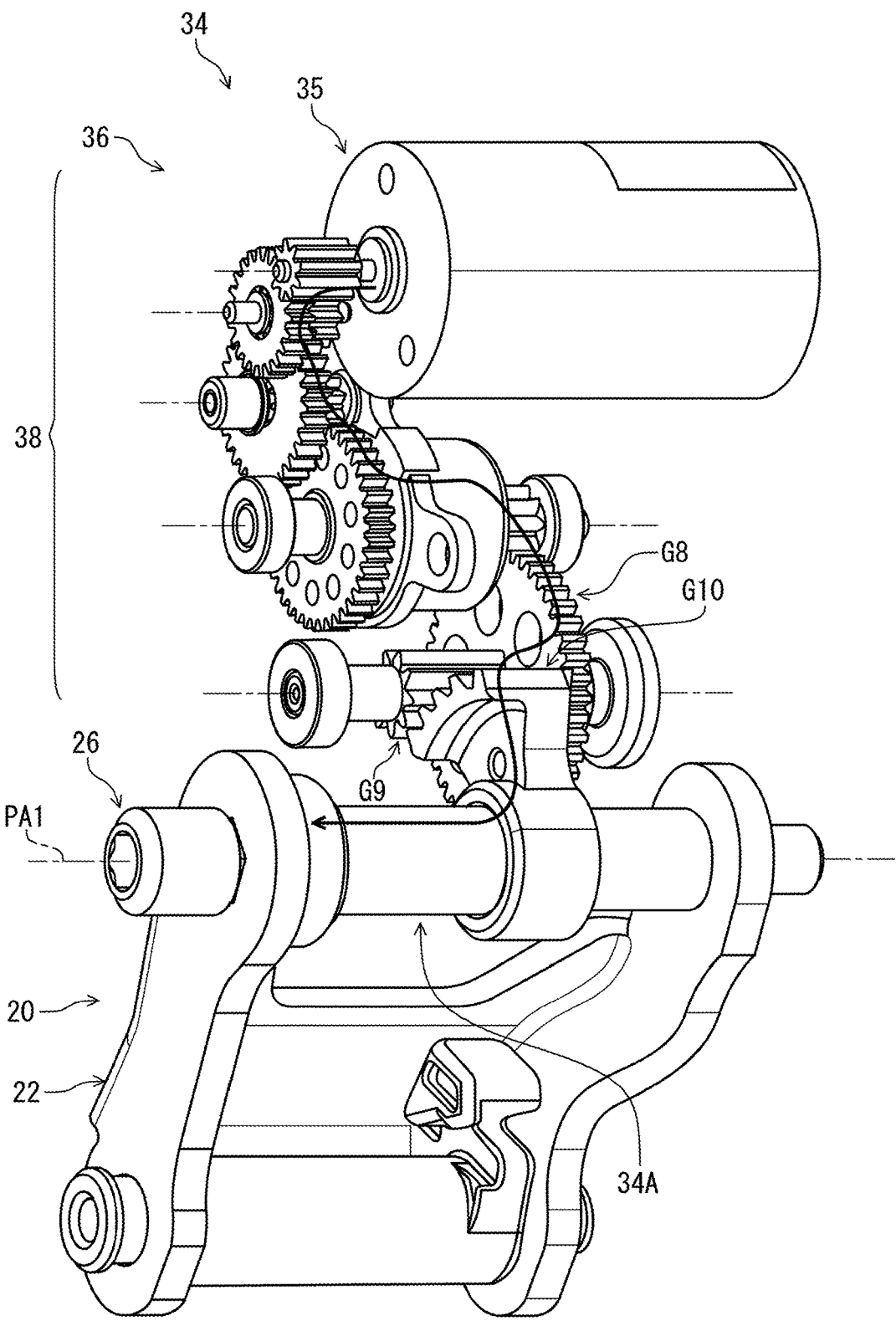
FIG. 5 is a perspective view of a motor unit of the bicycle derailleur illustrated in FIG. 2.

As seen in FIG. 5, the motor unit 34 comprises a motor 35 and a gear structure 36. The motor 35 is configured to generate the rotational force. Examples of the motor 35 include a direct-current (DC) motor and a stepper motor. However, the motor 35 can include other type of motor.

The gear structure 36 is configured to transmit the rotational force. The gear structure 36 includes a plurality of gears 38. The plurality of gears 38 is configured to transmit the rotational force to the at least one of the chain guide 18 and the linkage structure 20. In the present embodiment, the plurality of gears 38 is configured to transmit the rotational force to the linkage structure 20. The plurality of gears 38 is configured to transmit the rotational force to the linkage structure 20 through the first link pin 26. However, the plurality of gears 38 can be configured to transmit the rotational force directly to the chain guide 18 or both the chain guide 18 and the linkage structure 20.

The motor unit 34 includes an output shaft 34A. The motor unit 34 is configured to rotate the output shaft 34A. The output shaft 34A is coupled to the first link pin 26 to rotate along with the first link pin 26. The plurality of gears 38 includes an output gear G10 secured to the output shaft 34A.

Figure 6:
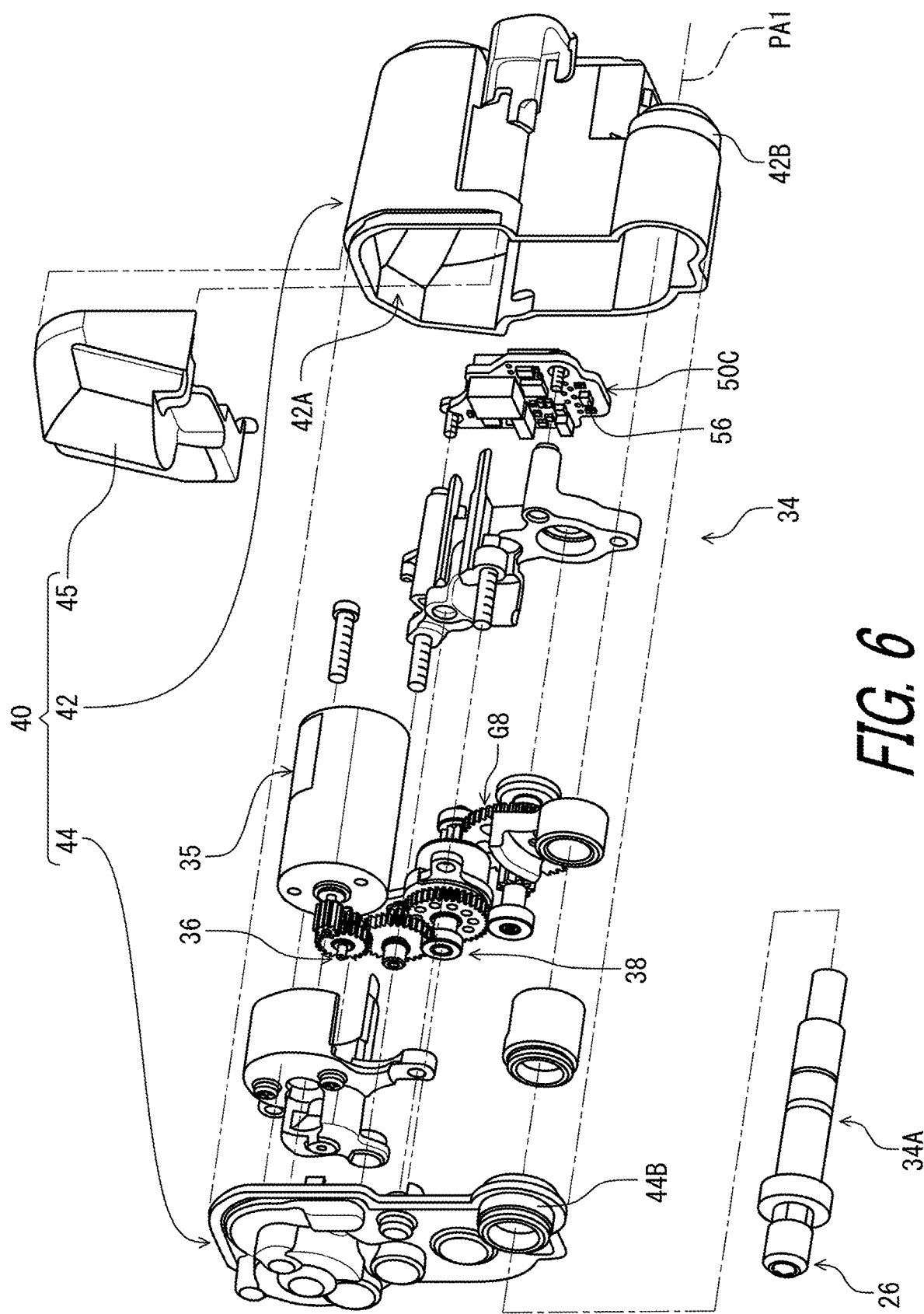
FIG. 6 is an exploded perspective view of the motor unit of the bicycle derailleur illustrated in FIG. 2.

As seen in FIG. 6, the motor unit 34 includes a housing 40. The motor 35 and the gear structure 36 are provided in the housing 40. The housing 40 includes a first housing 42, a second housing 44, and a third housing 45. The first housing 42 includes an accommodation space 42A. The motor 35 and the gear structure 36 are provided in the accommodation space 42A. The second housing 44 is attached to the first housing 42 to cover an end opening of the accommodation space 42A. The third housing 45 is attached to the first housing 42 to hold the second housing 44 between the first housing 42 and the third housing 45. The first housing 42 includes a first housing support part 42B. The second housing 44 includes a second housing support part 44B. The first link pin 26 is pivotally supported by the first housing support part 42B and the second housing support part 44B.

Figure 7:
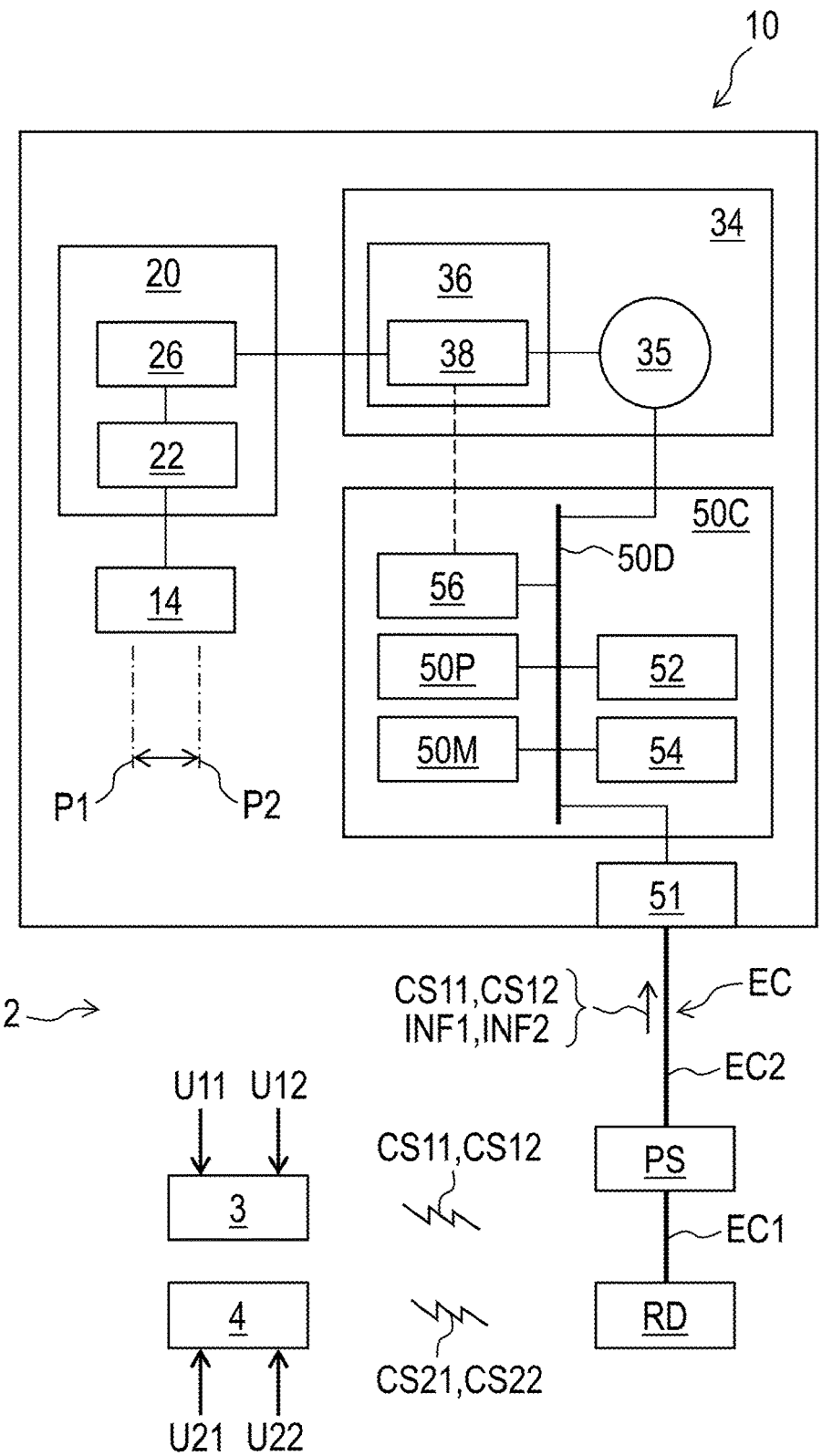
FIG. 7 is a schematic block diagram of the bicycle illustrated in FIG. 1.

As seen in FIG. 7, the bicycle derailleur 10 comprises a controller 50. The controller 50 is configured to control the motor unit 34 to move the movable member 14 relative to the base member 12 in response to a control signal transmitted from the operating device 4. The controller 50 is electrically connected to the motor unit 34. The controller 50 and the motor unit 34 are configured to be powered by the electric power source PS separately provided from the bicycle derailleur 10. The controller 50 is configured to communicate with the bicycle derailleur RD and the electric power source PS using the PLC through the electric wiring structure EC. However, the controller 50 can be configured to wirelessly communicate with the bicycle derailleur RD and the electric power source PS.

The bicycle derailleurs RD and 10 can be configured to wirelessly communicate with the operating devices 3 and 4 if electric power sources are directly mounted to the bicycle derailleurs RD and 10. Furthermore, the electric power source PS can be configured to be shared between at least one of the bicycle derailleurs 10 and RD and devices other than the bicycle derailleurs 10 and RD, such as an assist driving unit configured to apply assist force to the drive train DT (see, e.g., FIG. 1).

The bicycle derailleur 10 includes an electric port 51 to which the electric wiring structure EC is detachably connected. The electric port 51 is electrically connected to the controller 50.

The operating device 3 is configured to generate a first control signal CS11 in response to a first user input U11. The operating device 3 is configured to generate a second control signal CS12 in response to a second user input U12. The operating device 3 is configured to wirelessly transmit the first control signal CS11 in response to the first user input U11. The operating device 3 is configured to wirelessly transmit the second control signal CS12 in response to the second user input U12. For example, the operating device 3 includes a user interface (e.g., an electrical switch) and a communicator. Since the operating device 3 includes structures which has been known in the bicycle field, they will not be described in detail here for the sake of brevity.

Figure 8:
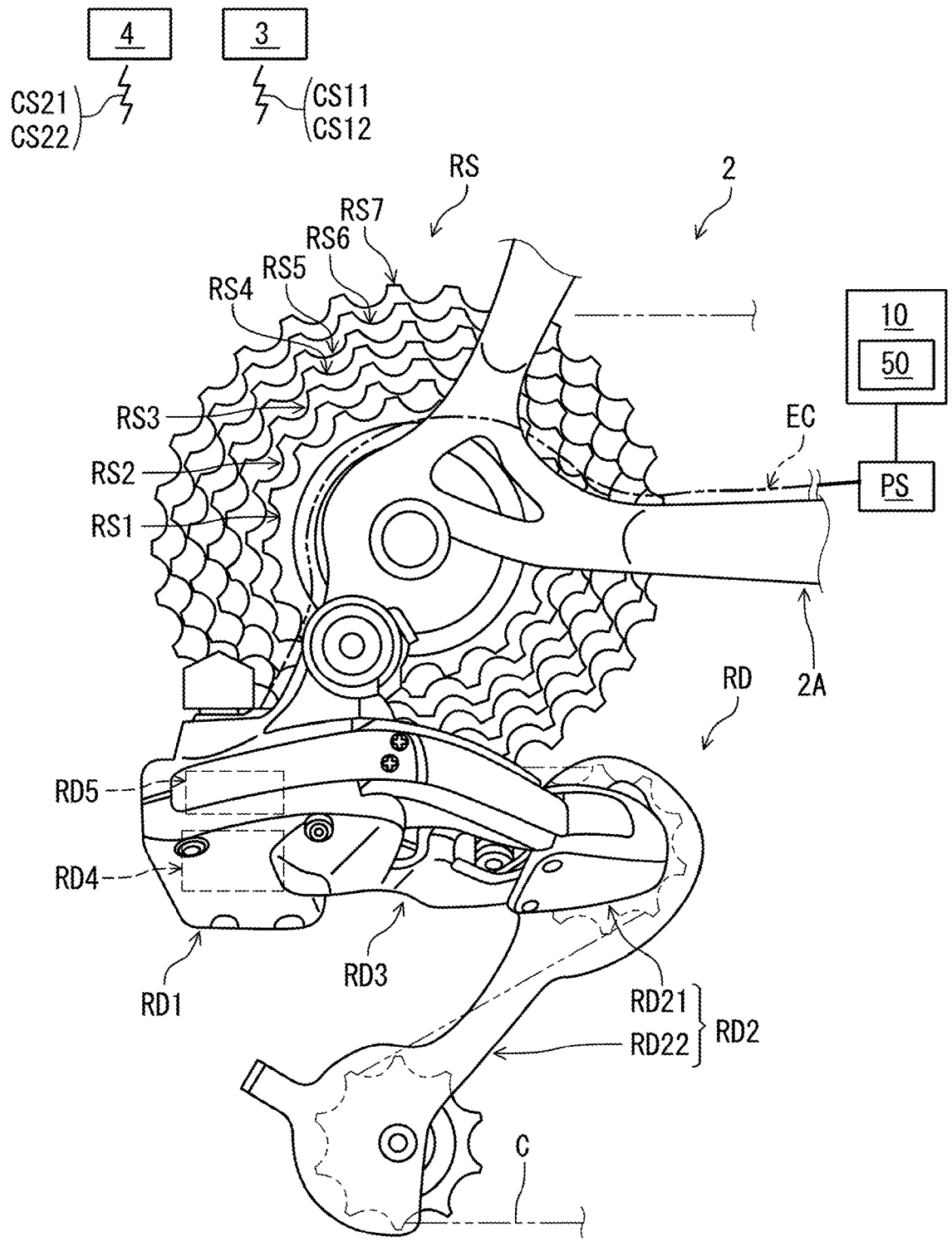
FIG. 8 is a side elevational view of an additional derailleur of the bicycle illustrated in FIG. 1.

As seen in FIG. 8, the controller 50 is configured to control the motor unit 34 to move the chain guide 18 relative to the base member 12 from the second gear position P2 to the first gear position P1 in response to the first control signal CS11. The controller 50 is configured to control the motor unit 34 is configured to move the chain guide 18 relative to the base member 12 from the first gear position P1 to the second gear position P2 in response to the second control signal CS12.

As seen in FIG. 7, in the present embodiment, the bicycle derailleur RD is configured to wirelessly communicate with the operating devices 3 and 4. The bicycle derailleur RD is configured to wirelessly receive each of the first control signal CS11 and the second control signal CS12 from the operating device 3. The bicycle derailleur RD is configured to transmit each of the first control signal CS11 and the second control signal CS12 to the bicycle derailleur 10 through the electric wiring structure EC. However, the bicycle derailleur 10 can be configured to wirelessly receive each of the first control signal CS11 and the second control signal CS12 from the operating device 3.

The controller 50 includes a processor 50P, a memory 50M, a circuit board 50C, and a system bus 50D. The processor 50P and the memory 50M are electrically mounted on the circuit board 50C. The processor 50P includes a central processing unit (CPU) and a memory controller. The memory 50M is electrically connected to the processor 50P. The memory 50M includes a read only memory (ROM) and a random-access memory (RAM). The memory 50M includes storage areas each having an address in the ROM and the RAM. The processor 50P is configured to control the memory 50M to store data in the storage areas of the memory 50M and reads data from the storage areas of the memory 50M. The memory 50M (e.g., the ROM) stores a program. The program is read into the processor 50P, and thereby the configuration and/or algorithm of the controller 50 is performed.

The controller 50 includes a motor driver 52 and a communicator 54. The motor driver 52 and the communicator 54 are electrically mounted on the circuit board 50C. The motor 35, the motor driver 52, and the communicator 54 are electrically connected to each other through the circuit board 50C and the system bus 50D. The motor driver 52 is configured to control the motor 35 in response to at least one of the first control signal CS11 and the second control signal CS12 transmitted from the operating device 3. The communicator 54 is configured to receive the first control signal CS11 and the second control signal CS12 from the operating device 3. The communicator 54 is configured to transmit and/or receive information to and/or from other devices using the PLC. The communicator 54 is configured to receive electric power from the electric power source PS.

The communicator 54 is configured to separate input signals to a power source voltage and control signals. The communicator 54 is configured to regulate the power source voltage to a level at which the controller 50 can properly operate. The communicator 54 is configured to change the power source voltage to a level at which the motor unit 34 moves the movable member 14. The communicator 54 is configured to change the power source voltage to different levels at which the motor unit 34 moves the movable member 14. The communicator 54 is further configured to superimpose output signals such as the first control signal CS11 and the second control signal CS12 on the power source voltage applied to the electric wiring structure EC from the electric power source PS. In the present embodiment, the communicator 54 includes a wired communicator. However, the communicator 54 can include a wireless communicator instead of or in addition to the wired communicator.

The bicycle derailleur 10 further comprises a rotation sensor 56. The rotation sensor 56 is configured to sense a rotational position of one of the plurality of gears 38 in the gear structure 36. The rotation sensor 56 is configured to sense a rotational position of one of the plurality of gears 38. The rotation sensor 56 is electrically mounted on the circuit board 50C. The rotation sensor 56 is electrically connected to the motor driver 52 and the communicator 54 through the circuit board 50C and the system bus 50D.

As seen in FIG. 6, the plurality of gears 38 includes a sensor gear G8. The rotation sensor 56 is configured to sense a rotational position of the sensor gear G8. In the present embodiment, the rotation sensor 56 includes an optical encoder. The rotation sensor 56 is configured to emit light to the sensor object 140 and configured to detect light reflected by the sensor object 140. However, the rotation sensor 56 can include another sensor instead of or in addition to the optical encoder. The rotation sensor 56 can be omitted from the bicycle derailleur 10. The rotation sensor 56 can be configured to sense a rotational position of another member provided in the motor unit 34.

As seen in FIG. 8, the additional derailleur RD includes a base member RD1, a movable member RD2, a linkage structure RD3, a motor unit RD4, and a controller RD5. The base member RD1 is configured to be mounted to the bicycle frame 2A. The movable member RD2 is movably coupled to the base member RD1. The movable member RD2 includes a movable body RD21 and a chain guide RD22. The chain guide RD22 is pivotally coupled to the movable body RD21. The linkage structure RD3 is movably couple the movable member RD2 to the base member RD1. The motor unit RD4 is configured to move the movable member RD2 relative to the base member RD1. The controller RD5 is configured to control the motor unit RD4 to move the movable member RD2 relative to the base member RD1 in response to a control signal transmitted from the operating device 4. The controller RD5 includes a wireless communicator configured to wirelessly communicate with the operating devices 3 and 4. The controller RD5 includes a position sensor configured to sense a current gear position of the movable member 14 relative to the base member 12. The controller RD5 is configured to transmit the current gear position to the controller 50 of the bicycle derailleur 10. The controller RD5 including the wireless communicator is provided inside the motor unit RD4. However, the controller RD5 can be provided in other positions outside the motor unit RD4.

The operating device 4 is configured to generate a first control signal CS21 in response to a first user input U21. The operating device 4 is configured to generate a second control signal CS22 in response to a second user input U22. The operating device 4 is configured to wirelessly transmit the first control signal CS21 in response to the first user input U21. The operating device 4 is configured to wirelessly transmit the second control signal CS22 in response to the second user input U22. For example, the operating device 4 includes a user interface (e.g., an electrical switch) and a communicator. Since the operating device 4 includes structures which has been known in the bicycle field, they will not be described in detail here for the sake of brevity.

Figure 9:
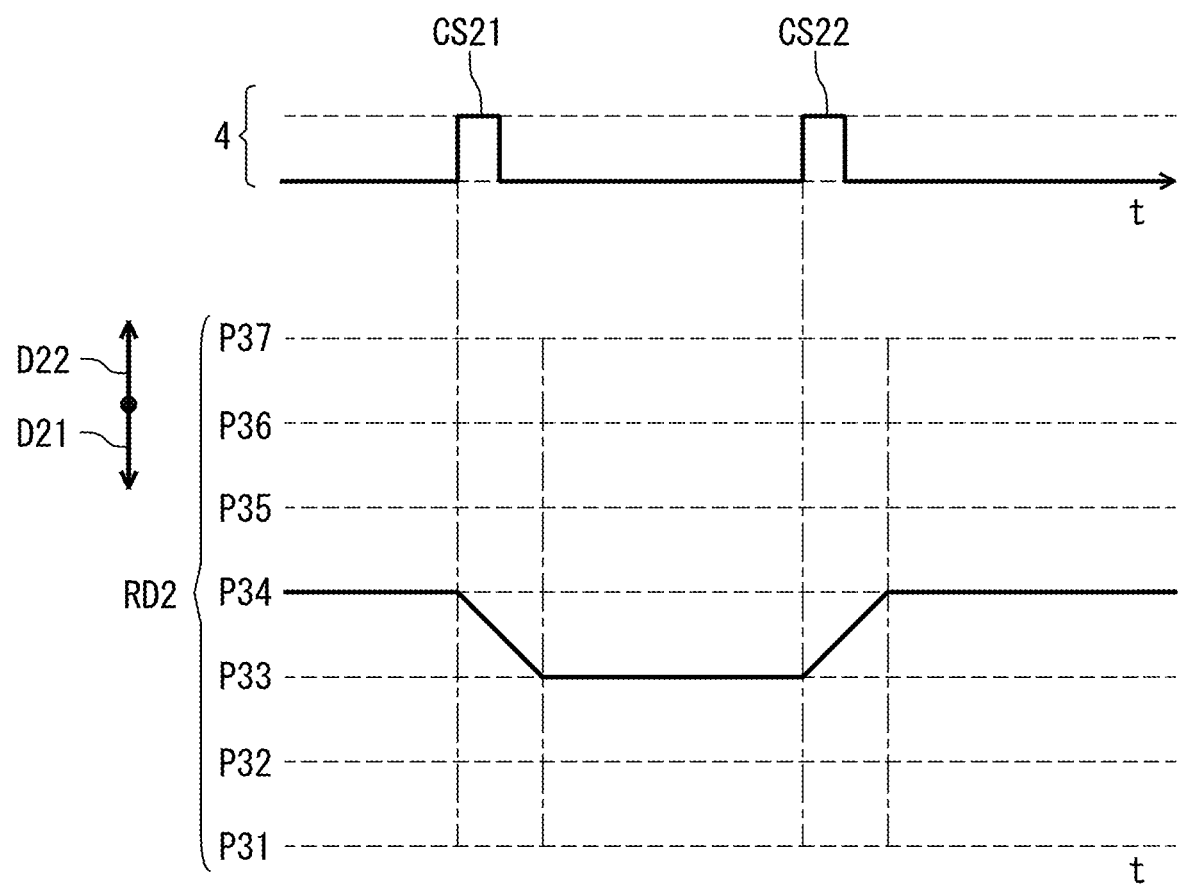
FIG. 9 is a timing chart showing a shifting operation of the additional derailleur illustrated in FIG. 8.

As seen in FIG. 9, the motor unit RD4 is configured to move the movable member RD2 relative to the base member RD1 between adjacent two gear positions of a plurality of gear positions P31 to P37 relative to the base member RD1 in each of a first shifting direction D11 and a second shifting direction D12. The second shifting direction D12 is an opposite direction of the first shifting direction D11. The motor unit RD4 is configured to maintain the movable member RD2 in each the plurality of gear positions P31 to P37 relative to the base member RD1. The plurality of gear positions P31 to P37 corresponds to the plurality of bicycle rear sprockets RS1 to RS7 (see, e.g., FIG. 9).

Figure 10:
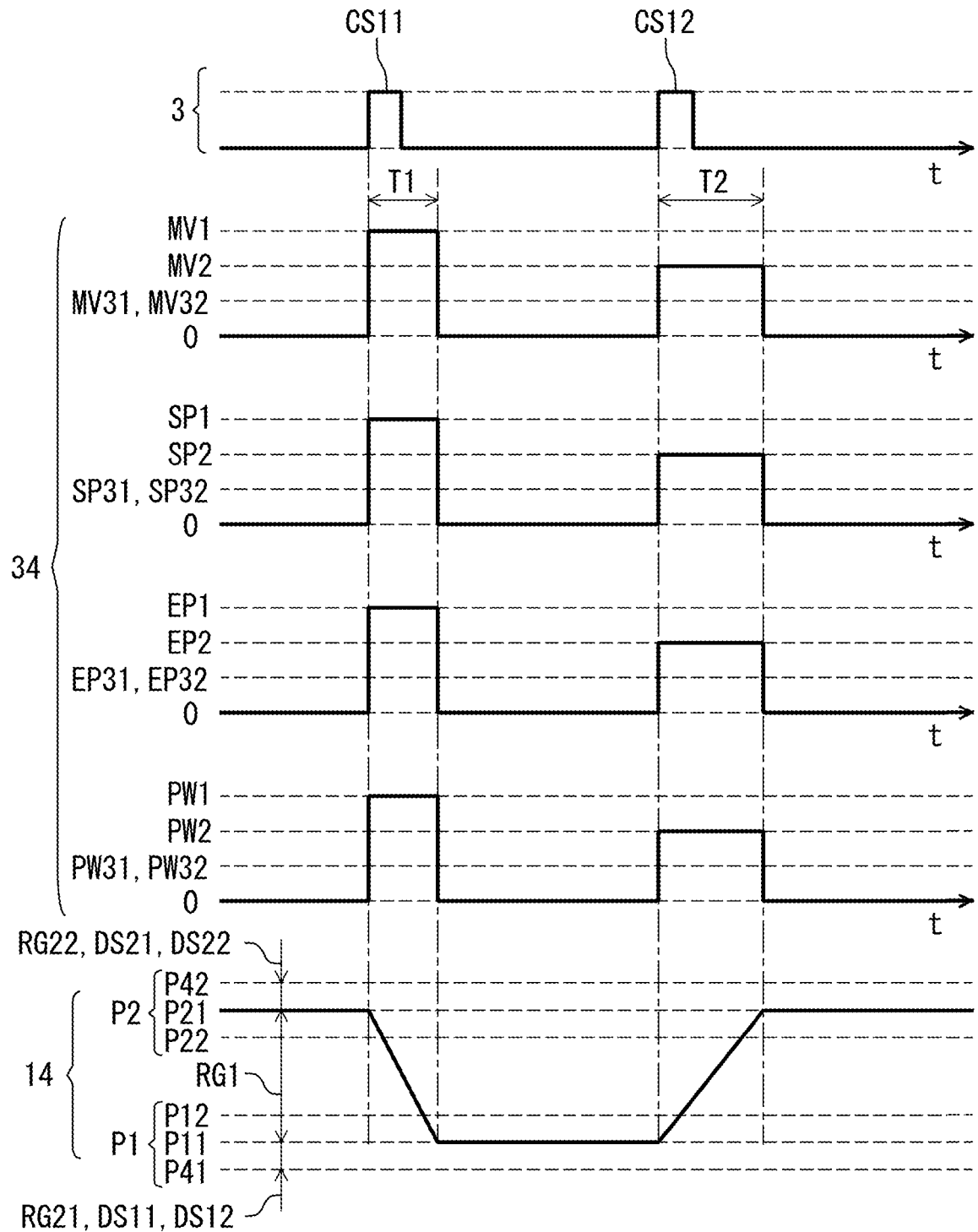
FIG. 10 is a timing chart showing a shifting operation of the bicycle derailleur illustrated in FIG. 2.
Figure 11:
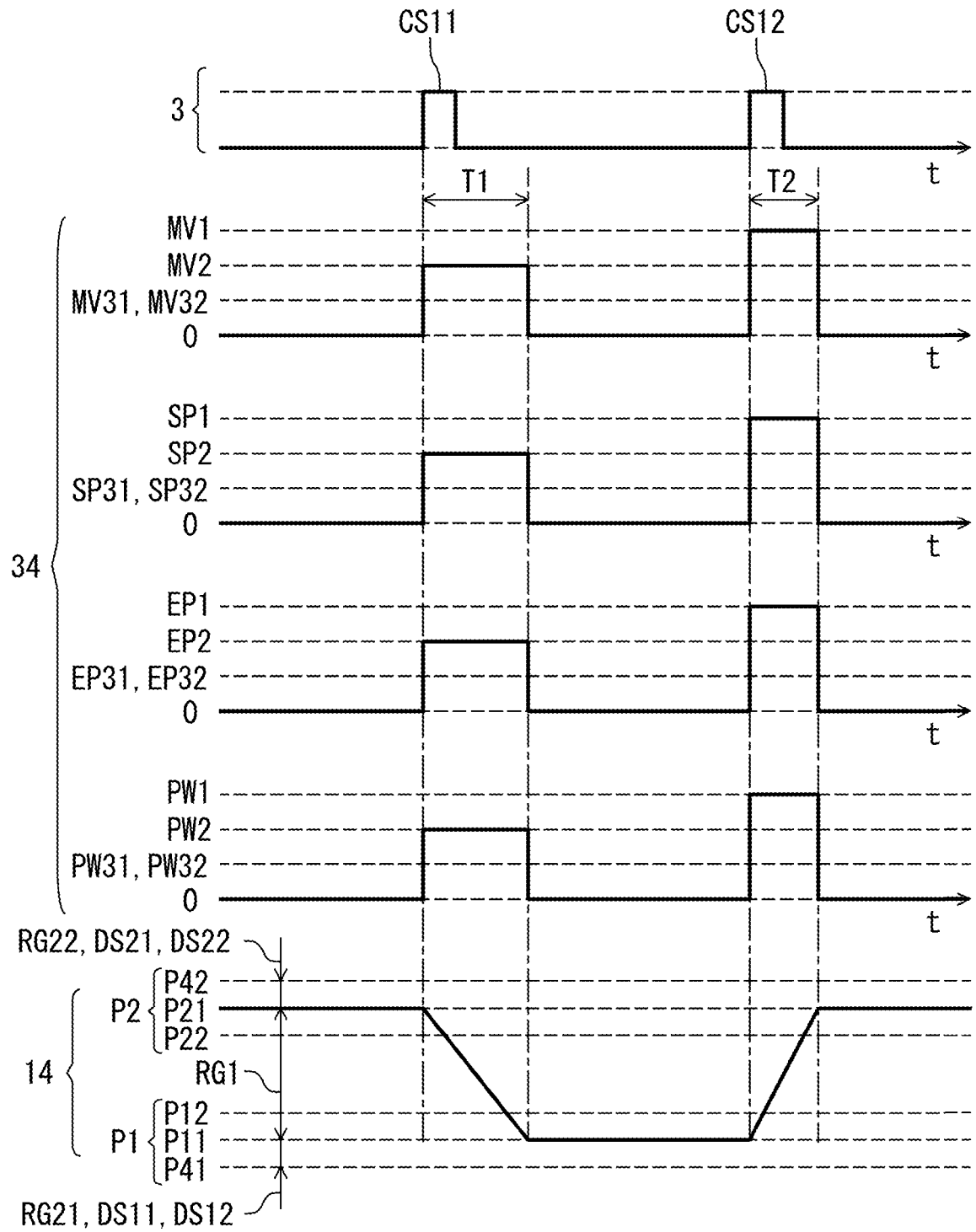
FIG. 11 is a timing chart showing a shifting operation of the bicycle derailleur illustrated in FIG. 2 (modification).

As seen in FIG. 10, the controller 50 is configured to control the motor unit 34 to rotate the output shaft 34A (see, e.g., FIG. 5) of the motor unit 34 at a first maximum voltage MV1 during a first shifting operation of the chain in the first shifting direction D11. The controller 50 is configured to control the motor unit 34 to rotate the output shaft 34A (see, e.g., FIG. 5) of the motor unit 34 at a second maximum voltage MV2 during a second shifting operation of the chain in the second shifting direction D12. The first maximum voltage MV1 is different from the second maximum voltage MV2. In the present embodiment, the first maximum voltage MV1 is higher than the second maximum voltage MV2. As seen in FIG. 11, however, the first maximum voltage MV1 can be lower than the second maximum voltage MV2 if needed and/or desired.

As seen in FIG. 10, the controller 50 is configured to control the motor unit 34 to move the movable member 14 relative to the base member 12 in the first shifting direction D11 at a first moving speed SP1. The controller 50 is configured to control the motor unit 34 to move the movable member 14 relative to the base member 12 in the second shifting direction D12 at a second moving speed SP2. The second moving speed SP2 is different from the first moving speed SP1. In the present embodiment, the first moving speed SP1 is higher than the second moving speed SP2. As seen in FIG. 11, however, the first moving speed SP1 can be lower than the second moving speed SP2.

As seen in FIG. 10, the motor unit 34 moves the movable member 14 relative to the base member 12 in the first shifting operation without stopping the movable member 14. The first moving speed SP1 is a moving speed at which the motor unit 34 moves the movable member 14 relative to the base member 12 in the first shifting direction D11 without stopping the movable member 14.

The motor unit 34 moves the movable member 14 relative to the base member 12 in the second shifting operation without stopping the movable member 14. The second moving speed SP2 is a moving speed at which the motor unit 34 moves the movable member 14 relative to the base member 12 in the second shifting direction D12 without stopping the movable member 14.

The first moving speed SP1 and the second moving speed SP2 can be calculated based on a total travel time of the movable member 14 and a total travel distance of the movable member 14. For example, the total travel time is a time defined from a timing at which the movable member 14 starts to move to a timing at which the movable member 14 finally stops. The travel distance is a distance defined from a starting position of the movable member 14 to a stop position of the movable member 14. The first moving speed SP1 and the second moving speed SP2 can be a moving speed of the movable member 14 at no load (e.g., without guiding the chain C).

The first moving speed SP1 and the second moving speed SP2 can be an average output speed of the motor unit 34. The output speed of the motor unit 34 is a rotational speed of the sensor gear G8 of the motor unit 34. The first moving speed SP1 and the second moving speed SP2 can be calculated based on a rotation time and a rotational angle of the sensor gear G8 of the motor unit 34. For example, the rotation time is a time defined from a timing at which the sensor gear G8 of the motor unit 34 starts to rotate to a timing at which the sensor gear G8 of the motor unit 34 finally stops. The rotational angle is a total angle defined from a starting angle of the sensor gear G8 of the motor unit 34 to a stop angle of the sensor gear G8 of the motor unit 34.

As seen in FIG. 10, a first direction operating time T1 is defined from a timing at which the motor unit 34 starts to move the movable member 14 relative to the base member 12 from the second gear position P2 toward the first gear position P1 in the first shifting direction D11 to a timing at which the motor unit 34 stops moving the movable member 14 at the first gear position P1. A second direction operating time T2 is defined from a timing at which the motor unit 34 starts to move the movable member 14 relative to the base member 12 from the first gear position P1 toward the second gear position P2 in the second shifting direction D12 to a timing at which the motor unit 34 stops moving the movable member 14 at the second gear position P2. The first direction operating time T1 is different from the second direction operating time T2. In the present embodiment, the first direction operating time T1 is shorter than the second direction operating time T2. As seen in FIG. 11, however, the first direction operating time T1 can be longer than the second direction operating time T2.

As seen in FIG. 10, the controller 50 is configured to control electric power supply to the motor unit 34 at a first amount of electric power EP1 in a state where the motor unit 34 moves the movable member 14 relative to the base member 12 in the first shifting operation. The controller 50 is configured to control electric power supply to the motor unit 34 at a second amount of electric power EP2 in a state where the motor unit 34 moves the movable member 14 relative to the base member 12 in the second shifting operation. The first amount of electric power EP1 is different from the second amount of electric power EP2. In the present embodiment, the first amount of electric power EP1 is larger than the second amount of electric power EP2. As seen in FIG. 11, however, the first amount of electric power EP1 can be smaller than the second amount of electric power EP2.

As seen in FIG. 10, the controller 50 is configured to control the motor unit 34 to generate first output power PW1 in a state where the motor unit 34 moves the movable member 14 relative to the base member 12 in the first shifting direction D11 at the first moving speed SP1. The controller 50 is configured to control the motor unit 34 to generate second output power PW2 in a state where the motor unit 34 moves the movable member 14 relative to the base member 12 in the second shifting direction D12 at the second moving speed SP2. The second output power PW2 is different from the first output power PW1. In the present embodiment, the first output power PW1 is larger than the second output power PW2. Each of the first output power PW1 and the second output power PW2 includes an output torque of the motor 35 or the motor unit 34. As seen in FIG. 11, however, the first output power PW1 can be smaller than the second output power PW2.

As seen in FIGS. 10 and 11, the method of controlling the bicycle derailleur 10 comprises controlling the motor unit 34 to move the movable member 14 relative to the base member 12 in the first shifting direction D1i at the first maximum voltage MV1. The method of controlling the bicycle derailleur 10 comprises controlling the motor unit 34 to move the movable member 14 relative to the base member 12 in the first shifting direction D11 at the first moving speed SP1. The method of controlling the bicycle derailleur 10 comprises controlling the motor unit 34 to move the movable member 14 relative to the base member 12 in the first shifting direction D11 at the first amount of electric power EP1. The method of controlling the bicycle derailleur 10 comprises controlling the motor unit 34 to move the movable member 14 relative to the base member 12 in the first shifting direction D11 at the first output power PW1.

The method of controlling the bicycle derailleur 10 comprises controlling the motor unit 34 to move the movable member 14 relative to the base member 12 in the second shifting direction D12 at the second maximum voltage MV2 different from the first maximum voltage MV1. The method of controlling the bicycle derailleur 10 comprises controlling the motor unit 34 to move the movable member 14 relative to the base member 12 in the second shifting direction D12 at the second moving speed SP2 different from the first moving speed SP1. The method of controlling the bicycle derailleur 10 comprises controlling the motor unit 34 to move the movable member 14 relative to the base member 12 in the second shifting direction D12 at the second amount of electric power EP2. The method of controlling the bicycle derailleur 10 comprises controlling the motor unit 34 to move the movable member 14 relative to the base member 12 in the second shifting direction D12 at the second output power PW2.

Figure 12:
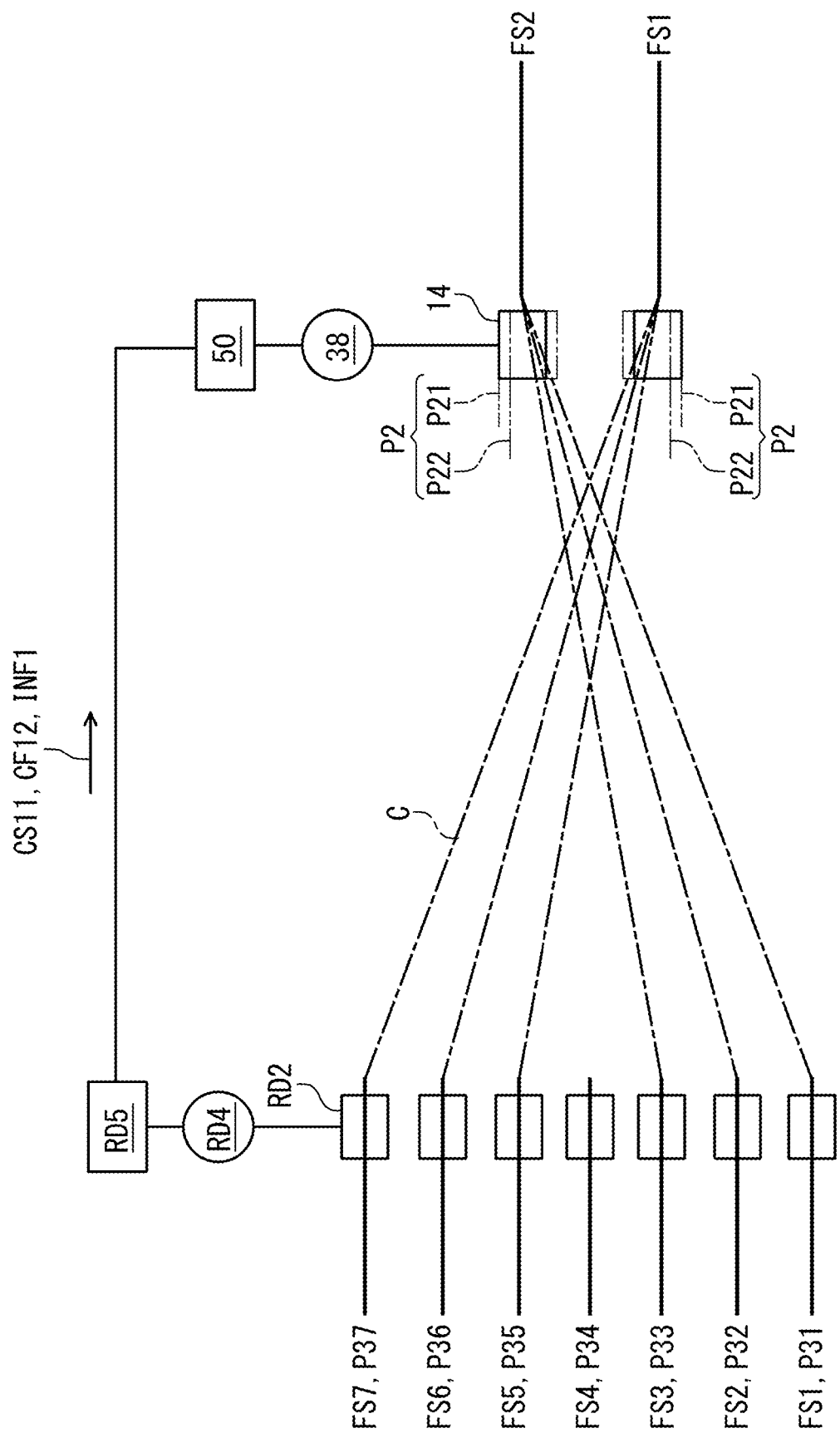
FIG. 12 is a schematic diagram of a drive train of the bicycle illustrated in FIG. 1.

As seen in FIG. 12, to reduce interference between the movable member 14 and the chain C, the controller 50 is configured to control the motor unit 34 to move the movable member 14 so as to adjust a position of the movable member 14 based on gear-position information INF1 of the additional derailleur RD. In the present embodiment, the gear-position information INF1 of the additional derailleur RD includes a current gear position of the additional derailleur RD among the plurality of gear positions P31 to P37. The additional derailleur RD is configured to transmit the gear-position information INF1 to the bicycle derailleur 10 upon the shifting operation of the additional derailleur RD.

The first gear position P1 includes a first initial gear position P11 and a first adjustment gear position P12. The first initial gear position P11 and the first adjustment gear position P12 are different from each other. The first adjustment gear position P12 is provided between the first initial gear position P11 and the second gear position P2. The controller 50 is configured to control the motor unit 34 to maintain the movable member 14 in each of the first initial gear position P11 and the first adjustment gear position P12.

The controller 50 is configured to control the motor unit 34 to move the movable member 14 from the first initial gear position P11 to the first adjustment gear position P12 if the controller 50 concludes that the gear position of the additional derailleur RD is changed from the gear position P36 to the gear position P37 based on the gear-position information INF1. The controller 50 is configured to control the motor unit 34 to move the movable member 14 from the first adjustment gear position P12 to the first initial gear position P11 if the controller 50 concludes that the gear position of the additional derailleur RD is changed from the gear position P37 to the gear position P36 based on the gear-position information INF1. The controller 50 is configured to control the motor unit 34 to maintain the movable member 14 in the first initial gear position P11 if the controller 50 concludes that the gear position of the additional derailleur RD is changed among the gear positions P31 to P36 based on the gear-position information INF1.

The second gear position P2 includes a second initial gear position P21 and a second adjustment gear position P22. The second initial gear position P21 and the second adjustment gear position P22 are different from each other. The second adjustment gear position P22 is provided between the second initial gear position P21 and the first gear position P1. The controller 50 is configured to control the motor unit 34 to maintain the movable member 14 in each of the second initial gear position P21 and the second adjustment gear position P22.

The controller 50 is configured to control the motor unit 34 to move the movable member 14 from the second initial gear position P21 to the second adjustment gear position P22 if the controller 50 concludes that the gear position of the additional derailleur RD is changed from the gear position P32 to the gear position P31 based on the gear-position information INF1. The controller 50 is configured to control the motor unit 34 to move the movable member 14 from the second adjustment gear position P22 to the second initial gear position P21 if the controller 50 concludes that the gear position of the additional derailleur RD is changed from the gear position P31 to the gear position P32 based on the gear-position information INF1. The controller 50 is configured to control the motor unit 34 to maintain the movable member 14 in the second initial gear position P21 if the controller 50 concludes that the gear position of the additional derailleur RD is changed among the gear positions P32 to P37 based on the gear-position information INF1.

Figure 13:
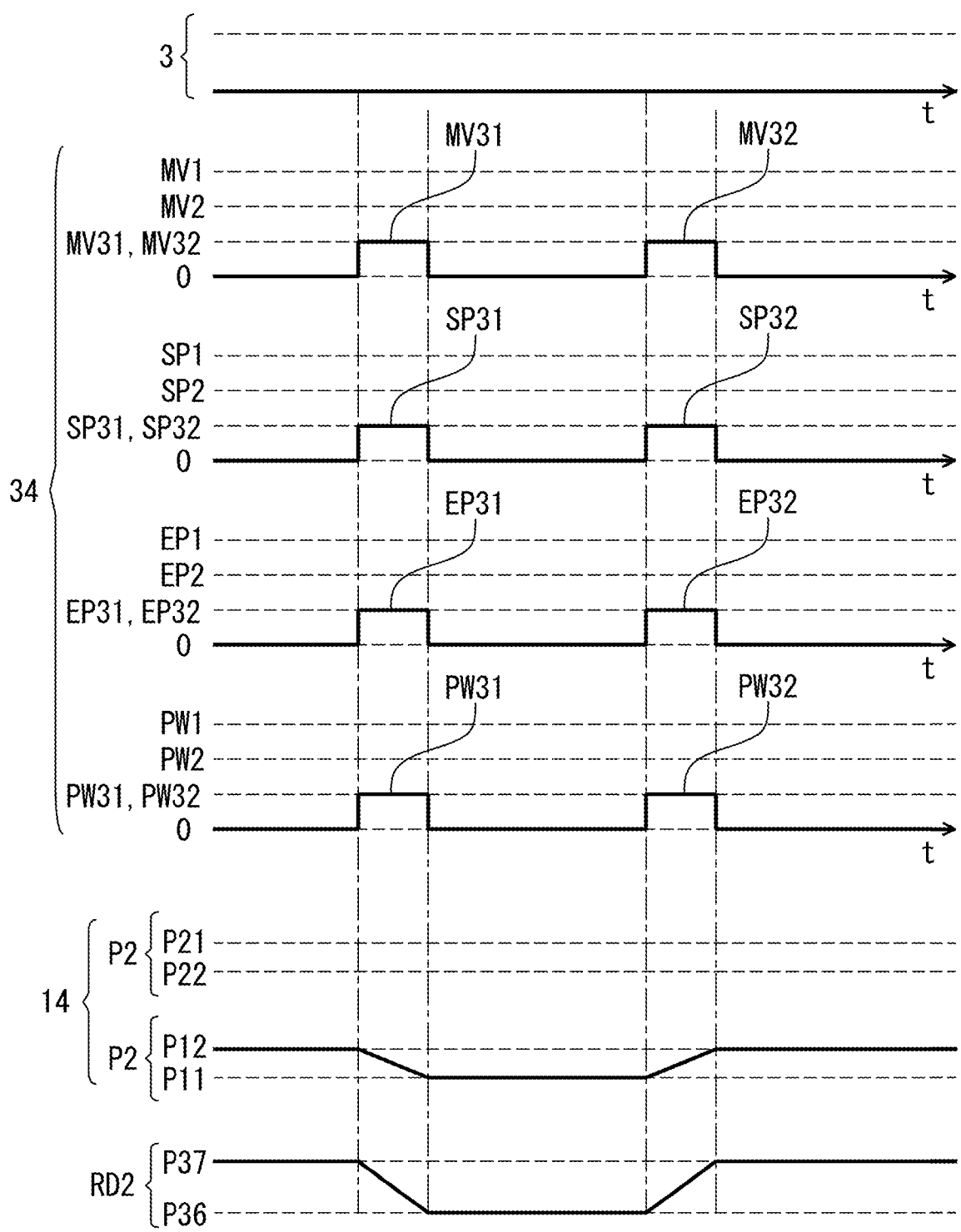
FIG. 13 is a timing chart showing an adjustment operation of the bicycle derailleur illustrated in FIG. 2.
Figure 14:
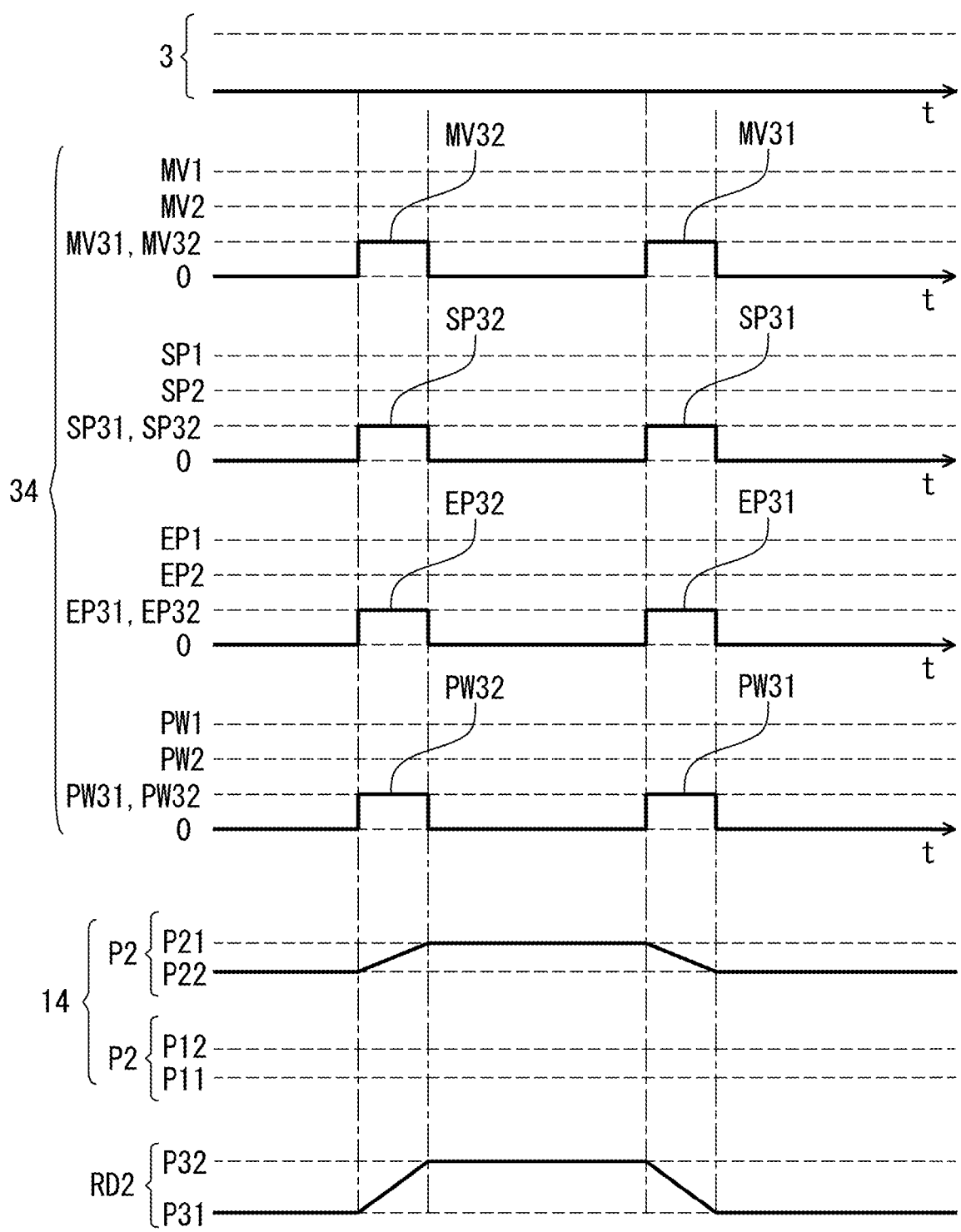
FIG. 14 is a timing chart showing the adjustment operation of the bicycle derailleur illustrated in FIG. 2.

As seen in FIGS. 13 and 14, the controller 50 is configured to control the motor unit 34 to move the movable member 14 at a third maximum voltage MV31 or MV32 so as to adjust the position of the movable member 14 based on the gear-position information INF1 of the additional derailleur RD which is a separate derailleur from the bicycle derailleur 10. The third maximum voltage MV31 or MV32 is different from the first maximum voltage MV1 and the second maximum voltage MV2. In the present embodiment, the third maximum voltage MV31 or MV32 is lower than the first maximum voltage MV1. The third maximum voltage MV31 or MV32 is lower than the second maximum voltage MV2. The third maximum voltage MV31 is equal to the third maximum voltage MV32. However, the third maximum voltage MV31 or MV32 can be equal to or higher than at least one of the first maximum voltage MV1 and the second maximum voltage MV2. The third maximum voltage MV31 can be different from the third maximum voltage MV32.

The controller 50 is configured to control the motor unit 34 to move the movable member 14 at a third moving speed SP31 or SP32 so as to adjust the position of the movable member 14 based on the gear-position information INF1 of the additional derailleur RD which is a separate derailleur from the bicycle derailleur 10. The third moving speed SP31 or SP32 is different from the first moving speed SP1 and the second moving speed SP2. In the present embodiment, the third moving speed SP31 or SP32 is lower than the first moving speed SP1. The third moving speed SP31 or SP32 is lower than the second moving speed SP2. The third moving speed SP31 is equal to the third moving speed SP32. However, the third moving speed SP31 or SP32 can be equal to or higher than at least one of the first moving speed SP1 and the second moving speed SP2. The third moving speed SP31 can be different from the third moving speed SP32.

The controller 50 is configured to control the motor unit 34 to move the movable member 14 at a third amount of electric power EP31 or EP32 so as to adjust the position of the movable member 14 based on the gear-position information INF1 of the additional derailleur RD. The third amount of electric power EP31 or EP32 is different from the first amount of electric power EP1 and the second amount of electric power EP2. In the present embodiment, the third amount of electric power EP31 or EP32 is smaller than the first amount of electric power EP1. The third amount of electric power EP31 or EP32 is smaller than the second amount of electric power EP2. The third amount of electric power EP31 is equal to the third amount of electric power EP32. However, the third amount of electric power EP31 or EP32 can be equal to or larger than at least one of the first amount of electric power EP2 and the second amount of electric power EP2. The third amount of electric power EP31 can be different from the third amount of electric power EP32.

The controller 50 is configured to control the motor unit 34 to move the movable member 14 at a third output power PW31 or PW32 so as to adjust the position of the movable member 14 based on the gear-position information INF1 of the additional derailleur RD. The third output power PW31 or PW32 is different from the first output power PW1 and the second output power PW2. In the present embodiment, the third output power PW31 or PW32 is smaller than the first output power PW1. The third output power PW31 or PW32 is smaller than the second output power PW2. The third output power PW31 is equal to the third output power PW32. However, the third output power PW31 or PW32 can be equal to or larger than at least one of the first output power PW1 and the second output power PW2. The third output power PW31 can be different from the third output power PW32.

Figure 15:
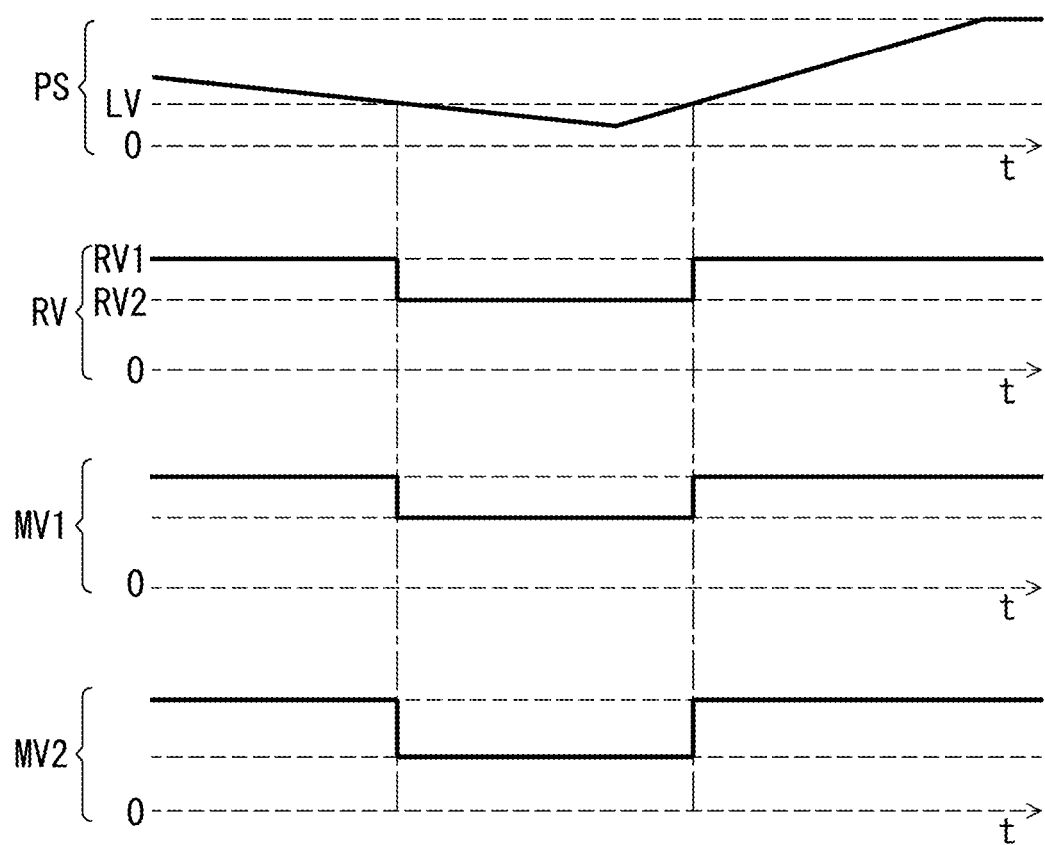
FIG. 15 is a timing chart showing a ratio changing operation of the bicycle derailleur illustrated in FIG. 2.

As seen in FIG. 15, the controller 50 is configured to change at least one of the first maximum voltage MV1 and the second maximum voltage MV2 based on power-source information INF2 relating to the electric power source PS configured to supply electric power to the bicycle derailleur 10. For example, the power-source information INF2 includes a remaining level of the electric power source PS.

In the present embodiment, the controller 50 is configured to reduce higher one of the first maximum voltage MV1 and the second maximum voltage MV2 if the remaining level of the electric power source PS is lower than a remaining-level threshold LV. The controller 50 is configured to reduce lower one of the first maximum voltage MV1 and the second maximum voltage MV2 if the remaining level of the electric power source PS is lower than the remaining-level threshold LV. The controller 50 is configured to reduce the first maximum voltage MV1 if the remaining level of the electric power source PS is lower than the remaining-level threshold LV. The controller 50 is configured to reduce the second maximum voltage MV2 if the remaining level of the electric power source PS is lower than the remaining-level threshold LV.

For example, the controller 50 is configured to change at least one of the first maximum voltage MV1 and the second maximum voltage MV2 to vary a ratio RV of higher one of the first maximum voltage MV1 and the second maximum voltage MV2 to lower one of the first maximum voltage MV1 and the second maximum voltage MV2 depending on the remaining level of the electric power source PS.

In the present embodiment, the controller 50 is configured to change at least one of the first maximum voltage MV1 and the second maximum voltage MV2 to vary the ratio RV of the first maximum voltage MV1 to the second maximum voltage MV2 depending on the remaining level of the electric power source PS. The controller 50 is configured to change the first maximum voltage MV1 and the second maximum voltage MV2 to vary the ratio RV of the first maximum voltage MV1 to the second maximum voltage MV2 depending on the remaining level of the electric power source PS. The controller 50 is configured to decrease the first maximum voltage MV1 and the second maximum voltage MV2 to change the ratio RV of the first maximum voltage MV1 to the second maximum voltage MV2 from an initial ratio RV1 to a predetermined ratio RV2 if the remaining level of the electric power source PS is lower than the remaining-level threshold LV. The controller 50 is configured to increase the first maximum voltage MV1 and the second maximum voltage MV2 to change the ratio RV of the first maximum voltage MV1 to the second maximum voltage MV2 from the predetermined ratio RV2 to the initial ratio RV1 if the remaining level of the electric power source PS is equal to or higher than the remaining-level threshold LV (e.g., when the electric power source PS is charged). However, the controller 50 can be configured to change only one of the first maximum voltage MV1 and the second maximum voltage MV2 to vary a ratio of the second maximum voltage MV2 to the first maximum voltage MV1 depending on the remaining level of the electric power source PS.

As with the first maximum voltage MV1 and the second maximum voltage MV2, the controller 50 can be configured to change at least one of the first moving speed SP1 and the second moving speed SP2 to vary a ratio RV of higher one of the first moving speed SP1 and the second moving speed SP2 to lower one of the first moving speed SP1 and the second moving speed SP2 depending on the remaining level of the electric power source PS. The controller 50 can be configured to change at least one of the first amount of electric power EP1 and the second amount of electric power EP2 to vary a ratio RV of higher one of the first amount of electric power EP1 and the second amount of electric power EP2 to lower one of the first amount of electric power EP1 and the second amount of electric power EP2 depending on the remaining level of the electric power source PS. The controller 50 can be configured to change at least one of the first output power PW1 and the second output power PW2 to vary a ratio RV of higher one of the first output power PW1 and the second output power PW2 to lower one of the first output power PW1 and the second output power PW2 depending on the remaining level of the electric power source PS.

As seen in FIGS. 10 and 11, in a normal mode, the controller 50 is configured to control the motor unit 34 to move the movable member 14 relative to the base member 12 based on gear-region information related to a gear corresponding region RG1 defined between the first gear position P1 and the second gear position P2. In the normal mode, the controller 50 is configured to control the motor unit 34 to move the movable member 14 from the second gear position P2 to the first gear position P1 in response to the first control signal CS11 if the movable member 14 is in the second gear position P2. The controller 50 is configured to control the motor unit 34 to maintain the movable member 14 in the second gear position P2 in response to the second control signal CS12 if the movable member 14 is in the second gear position P2. The controller 50 is configured to control the motor unit 34 to move the movable member 14 from the first gear position P1 to the second gear position P2 in response to the second control signal CS12 if the movable member 14 is in the first gear position P1. The controller 50 is configured to control the motor unit 34 to maintain the movable member 14 from the first gear position P1 in response to the first control signal CS11 if the movable member 14 is in the first gear position P1.

Figure 16:
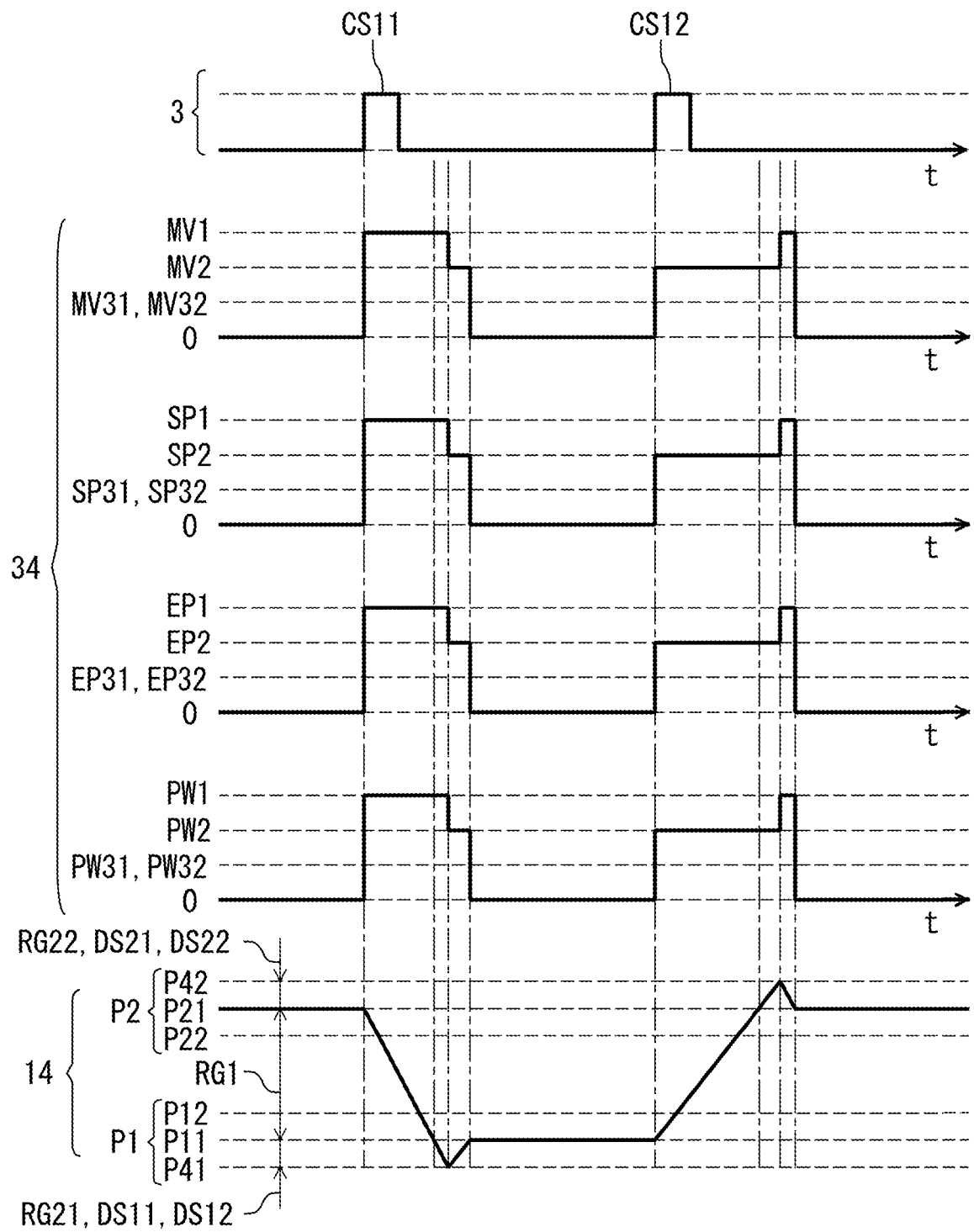
FIG. 16 is a timing chart showing an over-stroke operation of the bicycle derailleur illustrated in FIG. 2.

As seen in FIG. 16, the controller 50 has an over-stroke mode to facilitate the first and second shifting operations. For example, the operating device 3 or 4 (see, e.g., FIG. 7) includes a mode select interface with which the user can select the mode of the controller 50 between the normal mode and the over-stroke mode. In the over-stroke mode, the controller 50 is configured to control the motor unit 34 to adjust a position of the movable member 14 based on over-stroke information related to an over-stroke region RG21 or RG22. The over-stroke region RG21 or RG22 includes a region which is at least partly outside the gear corresponding region RG1. The over-stroke region RG21 includes a first over-stroke position P41. The over-stroke region RG22 includes a second over-stroke position P42. The first over-stroke position P41 and the second over-stroke position P42 are provided outside the gear corresponding region RG1. The first gear position P1 and the second gear position P2 are provided between the first over-stroke position P41 and the second over-stroke position P42.

In the over-stroke mode, the controller 50 is configured to control the motor unit 34, if the gear-region information satisfies a first adjustment condition, to move the movable member 14 relative to the base member 12 in the first shifting direction D11 by a first adjustment distance DS11. In the present embodiment, the first adjustment condition includes a condition where the movable member 14 reaches the first gear position P1. Thus, if the movable member 14 reaches the first gear position P1 in the first shifting operation, the controller 50 is configured to control the motor unit 34 to move the movable member 14 relative to the base member 12 from the first gear position P1 to the first over-stroke position P41 in the first shifting direction D11 by the first adjustment distance DS11. Namely, in the over-stroke mode, the controller 50 is configured to control the motor unit 34 to continuously move the movable member 14 from the second gear position P2 to the first over-stroke position P41 in the first shifting direction D11. The first adjustment distance DS11 is defined between the first gear position P1 and the first over-stroke position P41.

The controller 50 is configured to control the motor unit 34 to move the movable member 14 relative to the base member 12 in the second shifting direction D12 by a first return distance DS12 after moving the movable member 14 in the first shifting direction D11 by the first adjustment distance DS11. The first return distance DS12 is based on the over-stroke information. The first return distance DS12 is defined between the first gear position P1 and the first over-stroke position P41.

In the present embodiment, the controller 50 is configured to control the motor unit 34, if the gear-region information satisfies the first adjustment condition, to move the movable member 14 relative to the base member 12 at the first maximum voltage MV1 by the first adjustment distance DS11. The controller 50 is configured to control the motor unit 34 to move the movable member 14 relative to the base member 12 at the second maximum voltage MV2 by the first return distance DS12 after moving the movable member 14 at the first maximum voltage MV1 by the first adjustment distance DS11.

The controller 50 is configured to control the motor unit 34, if the gear-region information satisfies the first adjustment condition, to move the movable member 14 relative to the base member 12 at the first moving speed SP1 by the first adjustment distance DS1. The controller 50 is configured to control the motor unit 34 to move the movable member 14 relative to the base member 12 at the second moving speed SP2 by the first return distance DS12 after moving the movable member 14 by the first adjustment distance DS11.

The controller 50 is configured to control the motor unit 34, if the gear-region information satisfies the first adjustment condition, to move the movable member 14 relative to the base member 12 at the first amount of electric power EP1 by the first adjustment distance DS11. The controller 50 is configured to control the motor unit 34 to move the movable member 14 relative to the base member 12 at the second amount of electric power EP2 by the first return distance DS12 after moving the movable member 14 at the first amount of electric power EP1 by the first adjustment distance DS11.

The controller 50 is configured to control the motor unit 34, if the gear-region information satisfies the first adjustment condition, to move the movable member 14 relative to the base member 12 at the first output power PW1 by the first adjustment distance DS11. The controller 50 is configured to control the motor unit 34 to move the movable member 14 relative to the base member 12 at the second output power PW2 by the first return distance DS12 after moving the movable member 14 at the first output power PW1 by the first adjustment distance DS11.

In the present embodiment, the controller 50 is configured to control the motor unit 34 to move the movable member 14 relative to the base member 12 by the first adjustment distance DS11 under the same condition (e.g., the first maximum voltage MV1, the first moving speed SP1, the first amount of electric power EP1, and the first output power PW1) as the condition of the first shifting operation in the normal mode. However, the controller 50 can be configured to control the motor unit 34 to move the movable member 14 relative to the base member 12 by the first adjustment distance DS11 under a different condition from the condition of the first shifting operation in the normal mode.

The controller 50 is configured to control the motor unit 34 to move the movable member 14 relative to the base member 12 by the first return distance DS12 under the same condition (e.g., the second maximum voltage MV2, the second moving speed SP2, the second amount of electric power EP2, and the second output power PW2) as the condition of the second shifting operation in the normal mode. However, the controller 50 can be configured to control the motor unit 34 to move the movable member 14 relative to the base member 12 by the first return distance DS12 under a different condition from the condition of the second shifting operation in the normal mode.

As seen in FIG. 16, the controller 50 is configured to control the motor unit 34, if the gear-region information satisfies a second adjustment condition, to move the movable member 14 relative to the base member 12 in the second shifting direction D12 by a second adjustment distance DS21. In the present embodiment, the second adjustment condition includes a condition where the movable member 14 reaches the second gear position P2. Thus, if the movable member 14 reaches the second gear position P2 in the second shifting operation, the controller 50 is configured to control the motor unit 34 to move the movable member 14 relative to the base member 12 from the second gear position P2 to the second over-stroke position P42 in the second shifting direction D12 by the second adjustment distance DS21. Namely, in the over-stroke mode, the controller 50 is configured to control the motor unit 34 to continuously move the movable member 14 from the first gear position P1 to the second over-stroke position P42 in the second shifting direction D12. The second adjustment distance DS21 is defined between the second gear position P2 and the second over-stroke position P42.

The controller 50 is configured to control the motor unit 34 to move the movable member 14 relative to the base member 12 in the first shifting direction D11 by a second return distance DS22 after moving the movable member 14 in the second shifting direction D12 by the second adjustment distance DS21. The second return distance DS22 is based on the over-stroke information. The second return distance DS22 is defined between the second gear position P2 and the second over-stroke position P42.

In the present embodiment, the controller 50 is configured to control the motor unit 34, if the gear-region information satisfies the second adjustment condition, to move the movable member 14 relative to the base member 12 at the second maximum voltage MV2 by the second adjustment distance DS21. The controller 50 is configured to control the motor unit 34 to move the movable member 14 relative to the base member 12 at the first maximum voltage MV1 by the second return distance DS22 after moving the movable member 14 at the second maximum voltage MV2 by the second adjustment distance DS21.

The controller 50 is configured to control the motor unit 34, if the gear-region information satisfies the second adjustment condition, to move the movable member 14 relative to the base member 12 at the second moving speed SP2 by the second adjustment distance DS21. The controller 50 is configured to control the motor unit 34 to move the movable member 14 relative to the base member 12 at the first moving speed SP1 by the second return distance DS22 after moving the movable member 14 by the second adjustment distance DS21.

The controller 50 is configured to control the motor unit 34, if the gear-region information satisfies the second adjustment condition, to move the movable member 14 relative to the base member 12 at the second amount of electric power EP2 by the second adjustment distance DS21. The controller 50 is configured to control the motor unit 34 to move the movable member 14 relative to the base member 12 at the first amount of electric power EP1 by the second return distance DS22 after moving the movable member 14 at the second amount of electric power EP2 by the second adjustment distance DS21.

The controller 50 is configured to control the motor unit 34, if the gear-region information satisfies the second adjustment condition, to move the movable member 14 relative to the base member 12 at the second output power PW2 by the second adjustment distance DS21. The controller 50 is configured to control the motor unit 34 to move the movable member 14 relative to the base member 12 at the first output power PW1 by the second return distance DS22 after moving the movable member 14 at the second output power PW2 by the second adjustment distance DS21.

In the present embodiment, the controller 50 is configured to control the motor unit 34 to move the movable member 14 relative to the base member 12 by the second adjustment distance DS21 under the same condition (e.g., the second maximum voltage MV2, the second moving speed SP2, the second amount of electric power EP2, and the second output power PW2) as the condition of the second shifting operation in the normal mode. However, the controller 50 can be configured to control the motor unit 34 to move the movable member 14 relative to the base member 12 by the second adjustment distance DS21 under a different condition from the condition of the second shifting operation in the normal mode.

The controller 50 is configured to control the motor unit 34 to move the movable member 14 relative to the base member 12 by the second return distance DS22 under the same condition (e.g., the first maximum voltage MV1, the first moving speed SP1, the first amount of electric power EP1, and the first output power PW1) as the condition of the first shifting operation in the normal mode. However, the controller 50 can be configured to control the motor unit 34 to move the movable member 14 relative to the base member 12 by the second return distance DS22 under a different condition from the condition of the first shifting operation in the normal mode.

The structures of the bicycle derailleur 10 can apply to the bicycle derailleur RD, a gear box, or other derailleurs. In other derailleurs, as seen in FIG. 3, the same relationship between the gear ratio GR1 or GR2 and the moving direction of the movable member 14.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle derailleur comprising:
a base member;
a movable member configured to be movably coupled to the base member, the movable member being movable relative to the base member from a second gear position to a first gear position to move a chain in a first shifting direction, the movable member being movable relative to the base member from the first gear position to the second gear position to move the chain in a second shifting direction which is an opposite direction of the first shifting direction;
a motor unit configured to move the movable member relative to the base member between the first gear position and the second gear position; and
a controller configured to control the motor unit to rotate an output shaft of the motor unit at a first maximum voltage during a first shifting operation of the chain in the first shifting direction, the controller being configured to control the motor unit to rotate the output shaft of the motor unit at a second maximum voltage during a second shifting operation of the chain in the second shifting direction, the first maximum voltage being different from the second maximum voltage.

2. The bicycle derailleur according to claim 1, wherein
a gear ratio is defined as a quotient obtained by dividing a total tooth number of a bicycle front sprocket by a total tooth number of a bicycle rear sprocket,
the gear ratio includes a first gear ratio and a second gear ratio that is smaller than the first gear ratio,
the gear ratio changes from the second gear ratio to the first gear ratio in the first shifting operation,
the gear ratio changes from the first gear ratio to the second gear ratio in the second shifting operation, and
the first maximum voltage is higher than the second maximum voltage.

3. The bicycle derailleur according to claim 1, wherein
a gear ratio is defined as a quotient obtained by dividing a total tooth number of a bicycle front sprocket by a total tooth number of a bicycle rear sprocket,
the gear ratio includes a first gear ratio and a second gear ratio that is smaller than the first gear ratio,
the gear ratio changes from the second gear ratio to the first gear ratio in the first shifting operation,
the gear ratio changes from the first gear ratio to the second gear ratio in the second shifting operation, and
the first maximum voltage is lower than the second maximum voltage.

4. The bicycle derailleur according to claim 1, wherein
the motor unit is configured to move the movable member relative to the base member in the first shifting operation without stopping the movable member, and
the motor unit is configured to move the movable member relative to the base member in the second shifting operation without stopping the movable member.

5. The bicycle derailleur according to claim 1, wherein
the controller is configured to control electric power supply to the motor unit at a first amount of electric power in a state where the motor unit moves the movable member relative to the base member in the first shifting operation,
the controller is configured to control electric power supply to the motor unit at a second amount of electric power in a state where the motor unit moves the movable member relative to the base member in the second shifting operation, and
the first amount of electric power is different from the second amount of electric power.

6. The bicycle derailleur according to claim 5, wherein the first amount of electric power is larger than the second amount of electric power.

7. The bicycle derailleur according to claim 5, wherein the first amount of electric power is smaller than the second amount of electric power.

8. The bicycle derailleur according to claim 1, wherein
the controller is configured to control the motor unit to move the movable member relative to the base member based on gear-region information related to a gear corresponding region defined between the first gear position and the second gear position, and
the controller is configured to control the motor unit to adjust a position of the movable member based on over-stroke information related to an over-stroke region, and the over-stroke region includes a region which is at least partly outside the gear corresponding region.

9. The bicycle derailleur according to claim 1, wherein the controller is configured to control the motor unit to move the movable member at a third maximum voltage so as to adjust a position of the movable member based on gear-position information of an additional derailleur which is a separate derailleur from the bicycle derailleur, and
the third maximum voltage is lower than the first maximum voltage.

10. The bicycle derailleur according to claim 8, wherein the controller is configured to control the motor unit, if the gear-region information satisfies a first adjustment condition, to move the movable member relative to the base member in the first shifting direction by a first adjustment distance, and
the controller is configured to control the motor unit to move the movable member relative to the base member in the second shifting direction by a first return distance after moving the movable member in the first shifting direction by the first adjustment distance, and
the first return distance is based on the over-stroke information.

11. The bicycle derailleur according to claim 8, wherein the controller is configured to control the motor unit, if the gear-region information satisfies a second adjustment condition, to move the movable member relative to the base member in the second shifting direction by a second adjustment distance, and
the controller is configured to control the motor unit to move the movable member relative to the base member in the first shifting direction by a second return distance after moving the movable member in the second shifting direction by the second adjustment distance, and
the second return distance is based on the over-stroke information.

12. The bicycle derailleur according to claim 1, wherein the controller is configured to change at least one of the first maximum voltage and the second maximum voltage based on power-source information relating to an electric power source configured to supply electric power to the bicycle derailleur.

13. The bicycle derailleur according to claim 12, wherein the power-source information includes a remaining level of the electric power source, and
the controller is configured to reduce higher one of the first maximum voltage and the second maximum voltage if the remaining level of the electric power source is lower than a remaining-level threshold.

14. The bicycle derailleur according to claim 12, wherein the power-source information includes a remaining level of the electric power source, and
the controller is configured to reduce lower one of the first maximum voltage and the second maximum voltage if the remaining level of the electric power source is lower than the remaining-level threshold.

15. The bicycle derailleur according to claim 12, wherein the power-source information includes a remaining level of the electric power source, and
the controller is configured to change at least one of the first maximum voltage and the second maximum voltage to vary a ratio of higher one of the first maximum voltage and the second maximum voltage to lower one of the first maximum voltage and the second maximum voltage depending on the remaining level of the electric power source.

16. A method of controlling a bicycle derailleur, comprising:
controlling a motor unit to move a movable member relative to a base member in a first shifting direction at a first maximum voltage; and
controlling the motor unit to move the movable member relative to the base member in a second shifting direction at a second maximum voltage different from the first maximum voltage, the second shifting direction being an opposite direction of the first shifting direction.

17. A bicycle derailleur comprising:
a base member;
a movable member configured to be movably coupled to the base member, the movable member being movable relative to the base member from a second gear position to a first gear position to move a chain in a first shifting direction, the movable member being movable relative to the base member from the first gear position to the second gear position to move the chain in a second shifting direction which is an opposite direction of the first shifting direction;
a motor unit configured to move the movable member relative to the base member between the first gear position and the second gear position; and
a controller configured to control the motor unit to move the movable member relative to the base member in the first shifting direction at a first moving speed, the controller being configured to control the motor unit to move the movable member relative to the base member in the second shifting direction at a second moving speed different from the first moving speed.

18. The bicycle derailleur according to claim 17, wherein a gear ratio is defined as a quotient obtained by dividing a total tooth number of a bicycle front sprocket by a total tooth number of a bicycle rear sprocket,
the gear ratio includes a first gear ratio and a second gear ratio that is smaller than the first gear ratio,
the gear ratio changes from the second gear ratio to the first gear ratio in the first shifting operation,
the gear ratio changes from the first gear ratio to the second gear ratio in the second shifting operation, and
the first moving speed is higher than the second moving speed.

19. The bicycle derailleur according to claim 17, wherein a gear ratio is defined as a quotient obtained by dividing a total tooth number of a bicycle front sprocket by a total tooth number of a bicycle rear sprocket,
the gear ratio includes a first gear ratio and a second gear ratio that is smaller than the first gear ratio,
the gear ratio changes from the second gear ratio to the first gear ratio in the first shifting operation,
the gear ratio changes from the first gear ratio to the second gear ratio in the second shifting operation, and
the first moving speed is lower than the second moving speed.

20. The bicycle derailleur according to claim 17, wherein the first moving speed is a moving speed at which the motor unit moves the movable member relative to the base member in the first shifting direction without stopping the movable member, and
the second moving speed is a moving speed at which the motor unit moves the movable member relative to the base member in the second shifting direction without stopping the movable member.

21. The bicycle derailleur according to claim 17, wherein
the controller is configured to control the motor unit to generate first output power in a state where the motor unit moves the movable member relative to the base member in the first shifting direction at the first moving speed,
the controller is configured to control the motor unit to generate second output power in a state where the motor unit moves the movable member relative to the base member in the second shifting direction at the second moving speed, and
the second output power is different from the first output power.

22. The bicycle derailleur according to claim 17, wherein
the controller is configured to control electric power supply to the motor unit at a first amount of electric power in a state where the motor unit moves the movable member relative to the base member in the first shifting operation,
the controller is configured to control electric power supply to the motor unit at a second amount of electric power in a state where the motor unit moves the movable member relative to the base member in the second shifting operation, and
the first amount of electric power is different from the second amount of electric power.

23. The bicycle derailleur according to claim 22, wherein the first amount of electric power is larger than the second amount of electric power.

24. The bicycle derailleur according to claim 22, wherein the first amount of electric power is smaller than the second amount of electric power.

25. The bicycle derailleur according to claim 17, wherein
the controller is configured to control the motor unit to move the movable member relative to the base member based on gear-region information related to a gear corresponding region defined between the first gear position and the second gear position, and
the controller is configured to control the motor unit to adjust a position of the movable member based on over-stroke information related to an over-stroke region, and
the over-stroke region includes a region which is at least partly outside the gear corresponding region.

26. The bicycle derailleur according to claim 17, wherein
the controller is configured to control the motor unit to move the movable member at a third moving speed so as to adjust a position of the movable member based on gear-position information of an additional derailleur which is a separate derailleur from the bicycle derailleur, and
the third moving speed is lower than the first moving speed.

27. The bicycle derailleur according to claim 25, wherein
the controller is configured to control the motor unit, if the gear-region information satisfies a first adjustment condition, to move the movable member relative to the base member at the first moving speed by a first adjustment distance, and
the controller is configured to control the motor unit to move the movable member relative to the base member at the second moving speed by a first return distance after moving the movable member by the first adjustment distance, and
the first return distance is based on the over-stroke information.

28. The bicycle derailleur according to claim 27, wherein the first moving speed is higher than the second moving speed.

29. The bicycle derailleur according to claim 27, wherein the first moving speed is lower than the second moving speed.

30. The bicycle derailleur according to claim 25, wherein
the controller is configured to control the motor unit, if the gear-region information satisfies a second adjustment condition, to move the movable member relative to the base member at the second moving speed by a second adjustment distance, and
the controller is configured to control the motor unit to move the movable member relative to the base member at the first moving speed by a second return distance after moving the movable member by the second adjustment distance, and
the second return distance is based on the over-stroke information.

31. The bicycle derailleur according to claim 30, wherein the first moving speed is higher than the second moving speed.

32. The bicycle derailleur according to claim 30, wherein the first moving speed is lower than the second moving speed.

33. The bicycle derailleur according to claim 17, wherein
a first direction operating time is defined from a timing at which the motor unit starts to move the movable member relative to the base member from the second gear position toward the first gear position in the first shifting direction to a timing at which the motor unit stops moving the movable member at the first gear position,
a second direction operating time is defined from a timing at which the motor unit starts to move the movable member relative to the base member from the first gear position toward the second gear position in the second shifting direction to a timing at which the motor unit stops moving the movable member at the second gear position, and
the first direction operating time is different from the second direction operating time.

34. A method of controlling a bicycle derailleur, comprising:
controlling a motor unit to move a movable member relative to a base member in a first shifting direction at a first moving speed; and
controlling the motor unit to move the movable member relative to the base member in a second shifting direction at a second moving speed different from the first moving speed, the second shifting direction being an opposite direction of the first shifting direction.

* * * * *